United States Patent
Kuranari et al.

(10) Patent No.: US 7,633,885 B2
(45) Date of Patent: Dec. 15, 2009

(54) ROUTE COMPUTING SYSTEM

(75) Inventors: Shinichi Kuranari, Yokohama (JP);
Wakana Matsumoto, Yokohama (JP);
Yuuji Itou, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 10/993,083

(22) Filed: Nov. 19, 2004

(65) Prior Publication Data

US 2006/0002394 A1 Jan. 5, 2006

(30) Foreign Application Priority Data

Jun. 30, 2004 (JP) ............................. 2004-193527

(51) Int. Cl.
*H04L 12/28* (2006.01)
(52) U.S. Cl. ...................... 370/254; 370/238
(58) Field of Classification Search ............ None
See application file for complete search history.

(56) References Cited

U.S. PATENT DOCUMENTS

| | | | | |
|---|---|---|---|---|
| 6,490,246 B2 * | 12/2002 | Fukushima et al. | ......... | 370/220 |
| 6,553,031 B1 * | 4/2003 | Nakamura et al. | ......... | 370/392 |
| 6,873,603 B1 * | 3/2005 | Ivaturi | ......... | 370/255 |
| 6,876,625 B1 * | 4/2005 | McAllister et al. | ......... | 370/221 |
| 6,886,054 B2 * | 4/2005 | Taninaka et al. | ......... | 710/52 |
| 7,058,016 B1 * | 6/2006 | Harper | ......... | 370/238 |
| 7,200,120 B1 * | 4/2007 | Greenberg et al. | ......... | 370/254 |
| 2002/0060986 A1 * | 5/2002 | Fukushima et al. | ......... | 370/218 |
| 2002/0196738 A1 | 12/2002 | Yagyu et al. | | |
| 2004/0202171 A1 * | 10/2004 | Hama | ......... | 370/395.1 |
| 2006/0029104 A1 * | 2/2006 | Jungck | ......... | 370/498 |
| 2007/0206591 A1 * | 9/2007 | Doviak et al. | ......... | 370/389 |

FOREIGN PATENT DOCUMENTS

| | | |
|---|---|---|
| JP | 10-301910 | 11/1998 |
| JP | 11-154979 | 6/1999 |
| JP | 2000-078194 | 3/2000 |
| JP | 2002-164913 | 6/2002 |
| JP | 2002-281072 | 9/2002 |
| JP | 2003-008627 | 1/2003 |
| JP | 2004-032569 | 1/2004 |

* cited by examiner

*Primary Examiner*—Michael J Moore, Jr.
(74) *Attorney, Agent, or Firm*—Katten Muchin Rosenman LLP

(57) ABSTRACT

A route computing system is capable of computing routes at a high speed at a low cost without the need for replacing the hardware of a transmission device. The transmission device has a destination information receiving unit for receiving destination information indicative of the destination of a packet from a terminal device. The transmission device also has a destination information storing unit for storing the destination information, and a routing packet sending unit for receiving a routing protocol packet from another transmission device and sending the routing protocol packet to the terminal device. The terminal device has a routing packet receiving unit for receiving the routing protocol packet sent from the routing packet sending unit. The terminal device also has a computing unit for recomputing the destination information based on the routing protocol packet, and a destination information sending unit for sending the recomputed destination information to the destination information receiving unit.

10 Claims, 21 Drawing Sheets

63 EXTERNAL COMPUTER MANAGEMENT INFORMATION

| EXTERNAL COMPUTER MAC ADDRESS | CONTROL PORT NUMBER | EXTERNAL COMPUTER IDENTIFICATION TAG VALUE | ROUTER INFORMATION NOTIFIED STATE | | PRIORITY | CPU (GHz) | MEMORY (Mbytes) |
|---|---|---|---|---|---|---|---|
| | | | DEVICE INFORMATION | ROUTE INFORMATION | | | |
| 00:0E:01:3D:01:02 | 120 | 10 | SENT | SENT | 1 | 2.0 | 512 |
| 00:03:0D:00:10:20 | 120 | 11 | SENT | UNSENT | 2 | 1.5 | 512 |
| 00:00:B0:30:22:15 | 120 | 12 | UNSENT | UNSENT | 3 | 1.0 | 768 |

FIG. 7

64 TAG VALUE MANAGEMENT INFORMATION

| ROUTER MAC ADDRESS | TAG VALUE |
|---|---|
| 00:0E:00:D2:11:12 | 10 |

FIG. 8

111 VPN ROUTE INFORMATION DATABASE

| VPN_ID | VPN ROUTE | NEIGHBOR | TRANSMISSION PORT |
|---|---|---|---|
| 1 | 192.100.10.2 | 2.2.2.2 | 130 |
| 1 | 192.100.10.5 | 2.2.2.2 | 130 |
| 1 | 192.100.10.11 | 3.3.3.3 | 122 |
| 2 | 172.27.11.2 | 4.4.4.4 | 132 |
| 2 | 172.27.11.100 | 2.2.2.2 | 130 |
| 2 | 172.27.11.158 | 3.3.3.3 | 122 |
| 2 | 172.27.11.170 | 5.5.5.5 | 135 |
| 3 | 100.100.55.2 | 2.2.2.2 | 130 |
| 3 | 100.100.55.10 | 3.3.3.3 | 122 |
| 5 | 192.168.20.5 | 4.4.4.4 | 132 |

FIG. 11

112 EXTERNAL COMPUTER VPN MANAGEMENT INFORMATION

| EXTERNAL COMPUTER MAC ADDRESS | EXTERNAL COMPUTER IDENTIFICATION TAG VALUE | ROUTER INFORMATION NOTIFIED STATE | | PROCESSING VPN_ID | CPU (GHz) | MEMORY (Mbytes) |
|---|---|---|---|---|---|---|
| | | DEVICE INFORMATION | ROUTE INFORMATION | | | |
| 00:0E:01:3D:01:02 | 20 | SENT | UNSENT | 2 | 2.0 | 512 |
| 00:03:0D:00:10:20 | 21 | SENT | UNSENT | 5 | 1.5 | 512 |
| 00:00:B0:30:22:15 | 22 | SENT | SENT | 1 | 1.0 | 768 |
| | | SENT | UNSENT | 3 | | |

FIG. 12

TAG VALUE MANAGEMENT INFORMATION

| ROUTER MAC ADDRESS | TAG VALUE | VPN_ID | PROTOCOL PROCESS |
|---|---|---|---|
| 00:0E:00:D2:11:12 | 20 | 2 | PROCESS 1 |
| | | 5 | PROCESS 2 |

161 TAG VALUE MANAGEMENT INFORMATION

| ROUTER MAC ADDRESS | TAG VALUE | MANAGEMENT DATA INFORMATION |
|---|---|---|
| 00:0E:00:D2:11:12 | 20 | INDEX 1 |
| 00:E0:32:01:23:22 | 21 | INDEX 2 |
| 10:02:05:D3:02:01 | 22 | INDEX 3 |

FIG. 17

| 191 EXTERNAL COMPUTER MANAGEMENT INFORMATION | | | | | | | | |
|---|---|---|---|---|---|---|---|---|
| EXTERNAL COMPUTER MAC ADDRESS | CONTROL PORT NUMBER | ROUTER IDENTI- FICATION TAG VALUE | EXTERNAL COMPUTER IDENTIFICATION TAG VALUE | ROUTER INFORMATION NOTIFIED STATE | | PRIORITY | CPU (GHz) | MEMORY (Mbytes) |
| | | | | CON- FIGURATION | PROTOCOL | | | |
| 00:0E:01:3D:01:02 | 120 | 10 | 1 | SENT | SENT | 1 | 2.0 | 512 |
| 00:03:0D:00:10:20 | 120 | 10 | 2 | SENT | UNSENT | 2 | 1.5 | 512 |
| 00:00:B0:30:22:15 | 120 | 10 | 3 | UNSENT | UNSENT | 3 | 1.0 | 768 |

FIG. 20

TAG VALUE MANAGEMENT INFORMATION 192

| ROUTER MAC ADDRESS | ROUTER IDENTIFICATION TAG VALUE | EXTERNAL COMPUTER IDENTIFICATION TAG VALUE | MANAGEMENT DATA INFORMATION |
|---|---|---|---|
| 00:0E:00:D2:11:12 | 10 | 1 | INDEX 1 |
| 00:E0:32:01:23:22 | 20 | 1 | INDEX 2 |
| 10:02:05:D3:02:01 | 30 | 1 | INDEX 3 |

FIG. 21

ROUTE COMPUTING SYSTEM

CROSS-REFERENCE TO RELATED APPLICATIONS

This application is based upon and claims the benefits of priority from the prior Japanese Patent Application No. 2004-193527, filed on Jun. 30, 2004, the entire contents of which are incorporated herein by reference.

BACKGROUND OF THE INVENTION (1) Field of the Invention

The present invention relates to a route computing system, and more particularly to a route computing system for computing a route based on routing protocol packets.

(2) Description of the Related Art

In recent years, IP-VPN (Internet Protocol-Virtual Private Network) services using the Internet have been in widespread usage as means for performing communications between divisions of enterprises, instead of conventional WANs (Wide Area Networks) using dedicated lines. IP-VPNs are realized by routers that are designed based on protocols such as OSPF (Open Shortest Path First), BGP (Border Gateway Protocol), and MPLS (Multiprotocol Label Switching). As the Internet has become more and more popular, there are growing demands for IDCs (Internet Date Centers). An IDC provides a service for connecting servers entrusted by a plurality of customers to a router for connection to the Internet and maintaining the servers.

Routers for carriers and enterprises are equipped with a forwarding engine having a CAM (Content Addressable Memory) as a hardware piece, for example, for searching for the destination route of a packet with a full-wire transfer capability in order to transfer the packet at a high speed. The destination of a packet is determined by the hardware-implemented forwarding engine, and the packet is transferred with a full-wire transfer capability. When a network route is changed due to an exchange of route information, the construction of a route database, a circuit fault, or the breakdown of another router, the route database is not recomputed by a forwarding engine, but by a dedicated protocol processor.

The number of Internet routes is growing year after year, making the Internet topology more complex. When a certain node is down, a large number of route changes occur. The period of time required to compute a new bypass route until communications are recovered is governed by the performance of the protocol processor of a router, and may sometimes reach several tens of seconds. Therefore, the protocol processor is required to be of high performance.

There is known a router which is capable of transferring data even when their route computer for computing routes suffer a failure (see, for example, Japanese Unexamined patent publication No. 2002-164913 (paragraphs [0018] and [0019], FIG. 2)). The router has a route computer and a responder for returning a Hello packet, the responder being separate from the route computer. In the event of a failure of the route computer, the responder continuously operates to exchange a Hello packet.

Another known router has a dedicated module for performing a forwarding process and a routing process. The module has a specially designed process of controlling a connection to a bus for reducing a reduction in a transfer capability when a plurality of modules are connected (see, for example, Japanese Unexamined patent publication No. 10-301910 (paragraphs [0035] through [0040], FIG. 1)).

Still another router has route computers for computing routes, associated with respective interfaces, so that route computations are distributed for making themselves higher in speed (see, for example, Japanese Unexamined patent publication No. 2003-8627 (paragraphs [0022] through [0024], FIG. 1)).

The built-in protocol processor of a router is difficult to replace itself alone. If it is to be replaced with a higher-performance protocol processor, then it is necessary to redesign and manufacture a hardware system including the processor, and hence the replacement is costly. Particularly, route computations performed by a router need to be processed at a high speed in order to shorten a communication cutoff time upon a route change. However, since route changes do not occur frequently, it is of little merit against an investment cost to redesign a hardware arrangement including a router processor for replacement.

SUMMARY OF THE INVENTION

It is an object of the present invention to provide a route computing system which makes it unnecessary to redesign a hardware arrangement for computing routes for a transmission device for replacement, and which is capable of computing routes at a low cost.

To achieve the above object, there is provided a route computing system for computing a route. The route computing system includes a transmission device having a destination information receiving unit for receiving destination information indicative of the destination of a packet, a destination information storing unit for storing the destination information, and a routing packet sending unit for receiving a routing protocol packet from another transmission device and sending the routing protocol packet, and a terminal device having a routing packet receiving unit for receiving the routing protocol packet sent from the routing packet sending unit, a computing unit for recomputing the destination information based on the routing protocol packet, and a destination information sending unit for sending the recomputed destination information to the destination information receiving unit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing the data structure of a packet that is sent and received when a terminal device is searched for.

FIG. 7 is a diagram showing the data structure of information relative to terminal devices that is managed by an external computer manager of the router.

FIG. 8 is a diagram showing the data structure of tag value management information managed by a terminal device.

FIG. 11 is a diagram showing the data structure of a VPN route information database managed by a VPN route computation distributor of the router.

FIG. 12 is a diagram showing the data structure of information relative to terminal devices that is managed by the VPN route computation distributor of the router.

FIG. 13 is a diagram showing the data structure of tag value management information managed by the terminal device.

FIG. 17 is a diagram showing the data structure of tag value management information managed by the terminal device.

FIG. 20 is a diagram showing the data structure of information relative to terminal devices that is managed by an external computer manager of the router.

FIG. 21 is a diagram showing the data structure of tag value management information managed by the terminal device.

DESCRIPTION OF THE PREFERRED EMBODIMENTS

The principles of the present invention will be described in detail below with reference to FIG. 1.

Figure 1:
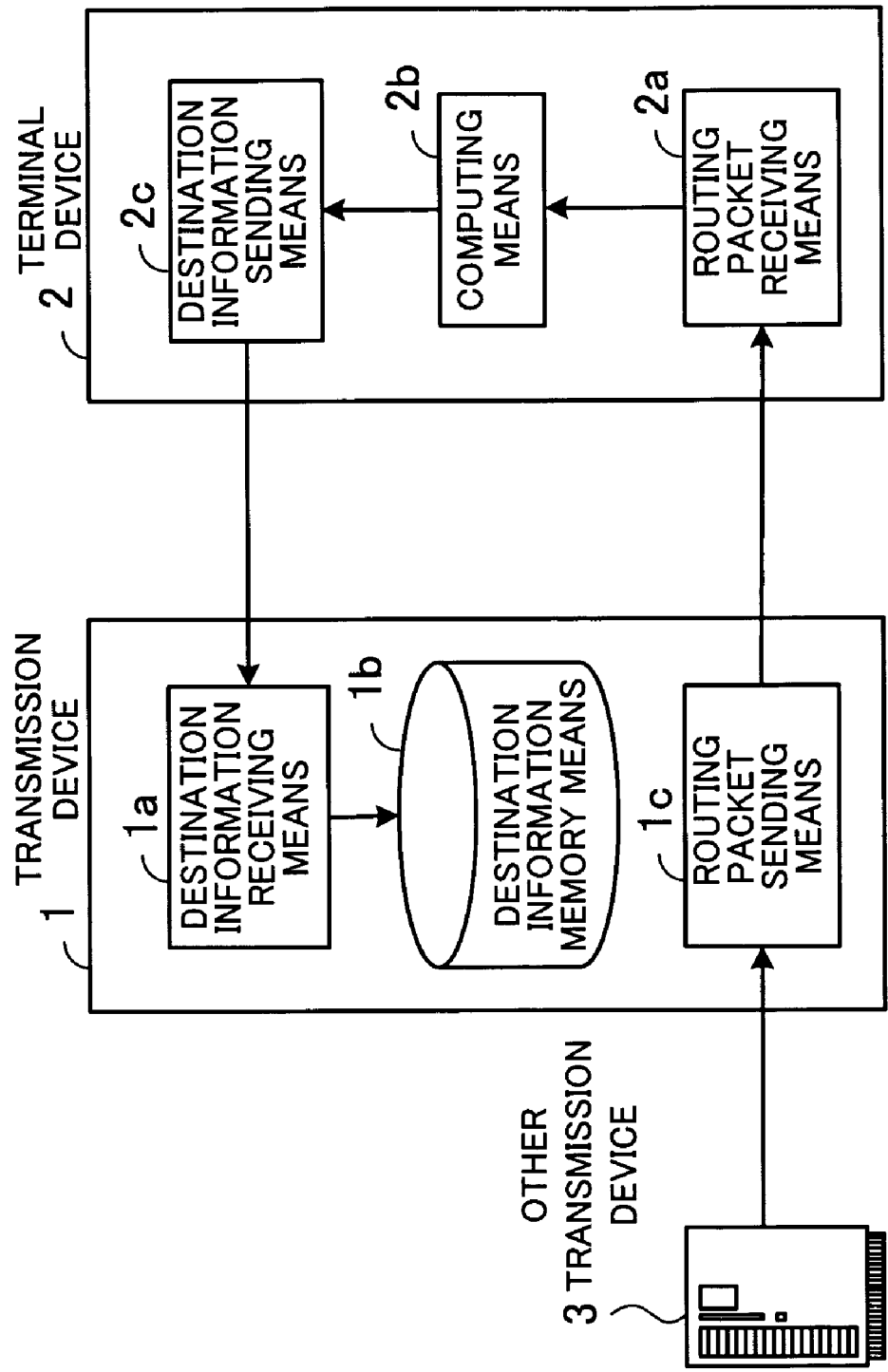
FIG. 1 is a block diagram showing the principles of a route computing system according to the present invention.

FIG. 1 shows in block form the principles of a route computing system according to the present invention.

As shown in FIG. 1, a transmission device 1 is connected to a terminal device 2 and another transmission device 3. When the transmission device 1 receives a routing protocol packet from the other transmission device 3, the transmission device 1 sends the routing protocol packet to the terminal device 2, causing the terminal device 2 to recompute destination information indicative of the destination of the packet. The transmission device 1 then receives the destination information recomputed by the terminal device 2.

The transmission device 1 has a destination information receiving means 1a, a destination information memory means 1b, and a routing packet sending means 1c. The terminal device 2 has a routing packet receiving means 2a, a computing means 2b, and a destination information sending means 2c.

The destination information receiving means 1a receives the destination information indicative of the destination of the packet from the terminal device 2. The destination information memory means 1b stores the destination information received by the destination information receiving means 1a. The routing packet sending means 1c receives a routing protocol packet from the other transmission device 3, and sends the routing protocol packet to the terminal device 2. Ordinary packets exchanged between terminal devices on a network, except for the terminal device 2, are transferred by referring to the destination information stored in the destination information memory means 1b.

The routing packet receiving means 2a receives a routing protocol packet sent from the routing packet sending means 1c. The computing means 2b recomputes destination information based on the routing protocol packet. The destination information sending means 2c sends the recomputed destination information to destination information receiving means 1a.

According to the route computing system, the transmission device 1 sends a routing protocol packet sent from the other transmission device 3 to the terminal device 2. The terminal device 2 recomputes destination information indicative of the destination of the packet based on the routing protocol packet sent from the transmission device 1, and sends the recomputed destination information to the transmission device 1.

As described above, the terminal device recomputes destination information indicative of the destination of a packet. For speeding up the computation of destination information, therefore, it is sufficient to replace the terminal device with a terminal device of higher performance, and it is unnecessary to redesign a hardware arrangement for a transmission device for replacement. The computation of destination information can be speeded up at a low cost.

A route computing system according to a first embodiment of the present invention will be described in detail below.

Figure 2:
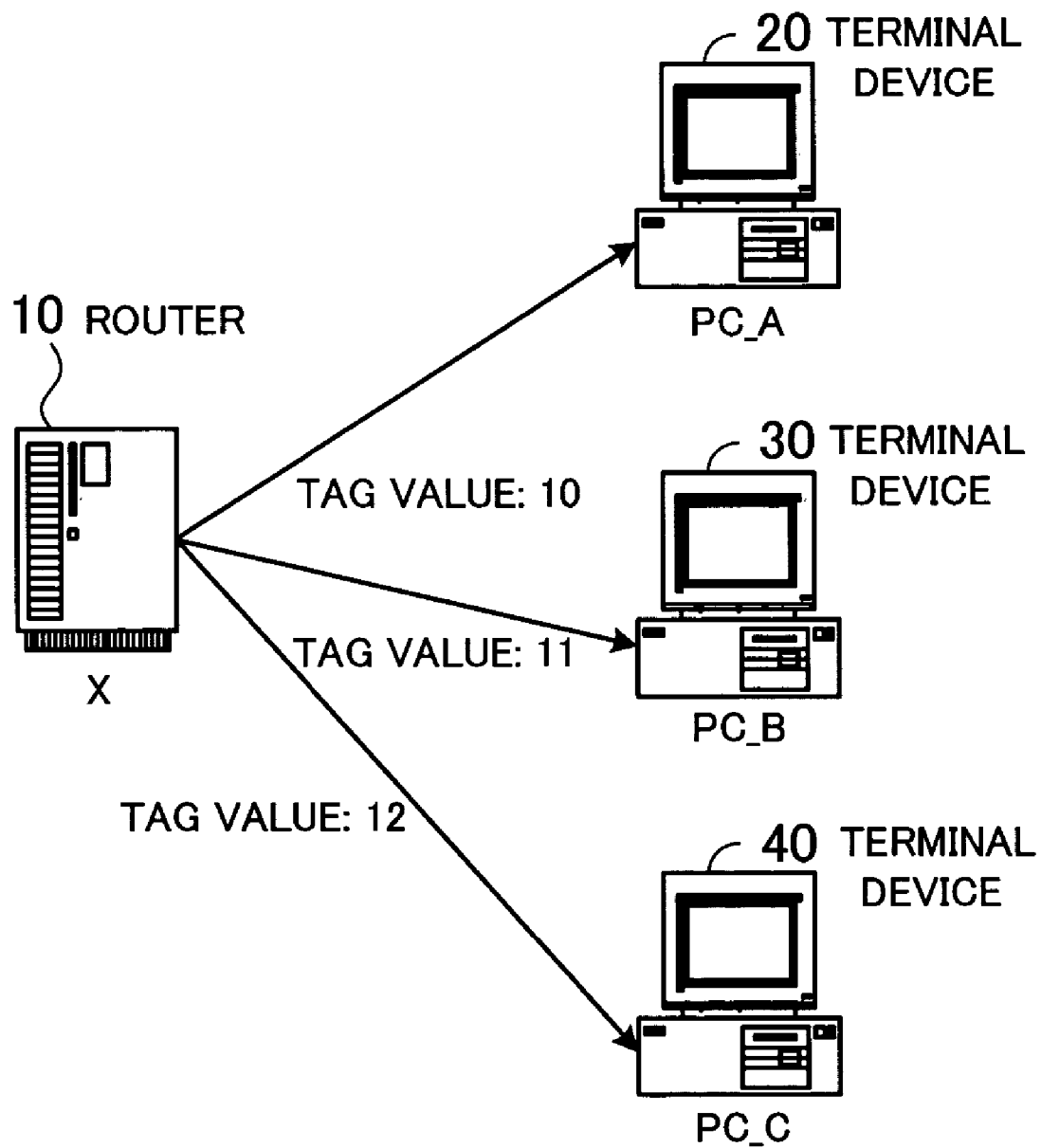
FIG. 2 is a view showing an arrangement of a route computing system according to a first embodiment of the present invention.

FIG. 2 is a view showing an arrangement of a route computing system according to a first embodiment of the present invention. As shown in FIG. 2, a router 10 is connected to a plurality of terminal devices 20 through 40 each comprising a PC (Personal Computer). The router 10 and the terminal devices 20 through 40 are connected to each other by Ethernet (registered trademark) or optical cables. Though not shown, the router 10 is also connected to other routers by Ethernet or optical cables. The router 10 is named "X", and the terminal devices 20 through 40 are named "PC_A", "PC_B", "PC_C", respectively. When it is necessary to compute a route due to a route change, the router 10 sends a packet necessary for route computation to the terminal devices 20 through 40, causing the terminal devices 20 through 40 to compute a route.

When the router 10 sends packets to the terminal devices 20 through 40, the router 10 adds tag values for identifying the terminal devices 20 through 40 to the respective packets. The terminal devices 20 through 40 refer the tag values added to the packets to recognize the packets that are addressed to themselves. In the embodiment shown in FIG. 2, the packet with the tag value 10 is a packet addressed to the terminal device 20, the packet with the tag value 11 is a packet addressed to the terminal device 30, and the packet with the tag value 12 is a packet addressed to the terminal device 40. When the terminal devices 20 through 40 send packets to the router 10, the terminal devices 20 through 40 add tag values to the respective packets. The router 10 refers to the tag values added to the packets to recognize which terminal devices the packets have been sent from.

Figure 3:
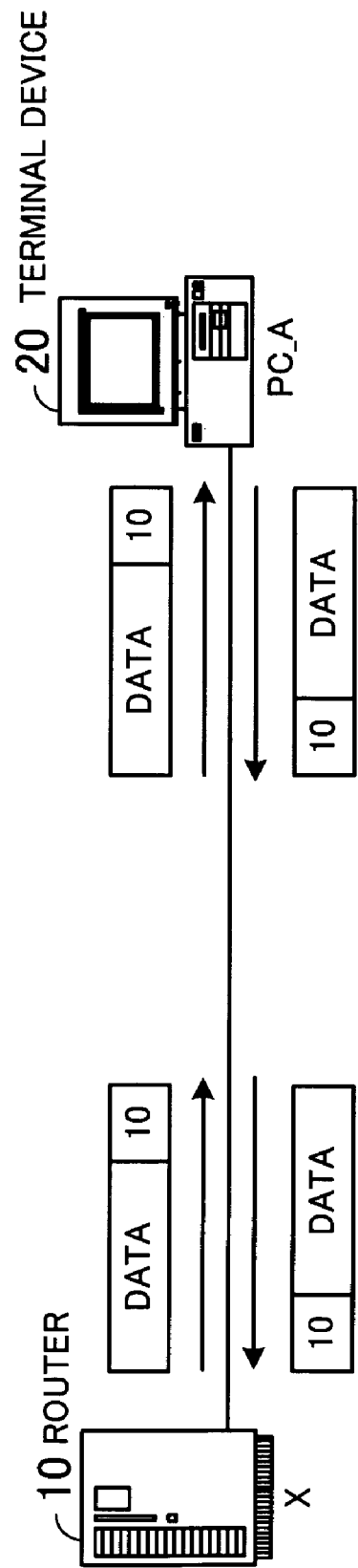
FIG. 3 is a view illustrative of tag values.

FIG. 3 is illustrative of tag values.

FIG. 3 shows the router 10 and the terminal device 20 which are illustrated in FIG. 2. When the router 10 sends a packet to the terminal device 20, the router 10 adds a tag value 10 to the beginning end of data to indicate that the packet is addressed to the terminal device 20. When the terminal device 20 sends a packet, the terminal device 20 also adds a tag value 10 to the beginning end of data to indicate that the packet is sent from the terminal device 20. The router 10 and the terminal device 20 can recognize the sources of the packets by referring to the tag values added to the beginning end of the data. A VLAN (Virtual Local Area Network) tag (VLANID according to IEEE802.1q) may be used to control such packets.

Referring back to FIG. 2, the terminal devices 20 through 40 refer to the tag values and receive the packets addressed to them, as described above with reference to FIG. 3. The terminal devices 20 through 40 compute routes based on the packets sent from the router 10. The terminal devices 20 through 40 send a forwarding control packet indicative of the computed routes to the router 10.

The router 10 has an ordering of priority as to the reception of forwarding control packets from the terminal devices 20 through 40. The ordering of priority is based on a descending order of the route computation processing capabilities of the terminal devices 20 through 40. That is, the router 10 receives forwarding control packets successively from the terminal devices 20 through 40 in the order of descending priorities. For example, if a highest-priority one of the terminal devices 20 through 40 fails, then the router 10 receives a forwarding control packet from the terminal device of second highest priority.

The router 10 updates a forwarding entry indicative of the destinations of ordinary packets based on the forwarding control packets received from the terminal devices 20 through 40.

As described above, when a route change occurs, the router 10 causes the external terminal devices 20 through 40 to compute routes. For speeding up the computation of routes, therefore, it is sufficient to replace the terminal devices 20 through 40 with terminal devices of higher performance, and it is unnecessary to replace the hardware of the router 10. Consequently, the computation of routes can be speeded up at a low cost. The plural terminal devices 20 through 40 provide redundancy for route computation such that in the event of a fault of a highest-priority one of the terminal devices 20 through 40, the terminal device of second highest priority continues to compute a route for highly reliable operation.

Functions of the router 10 and the terminal devices 20 through 40 will be described below.

Figure 4:
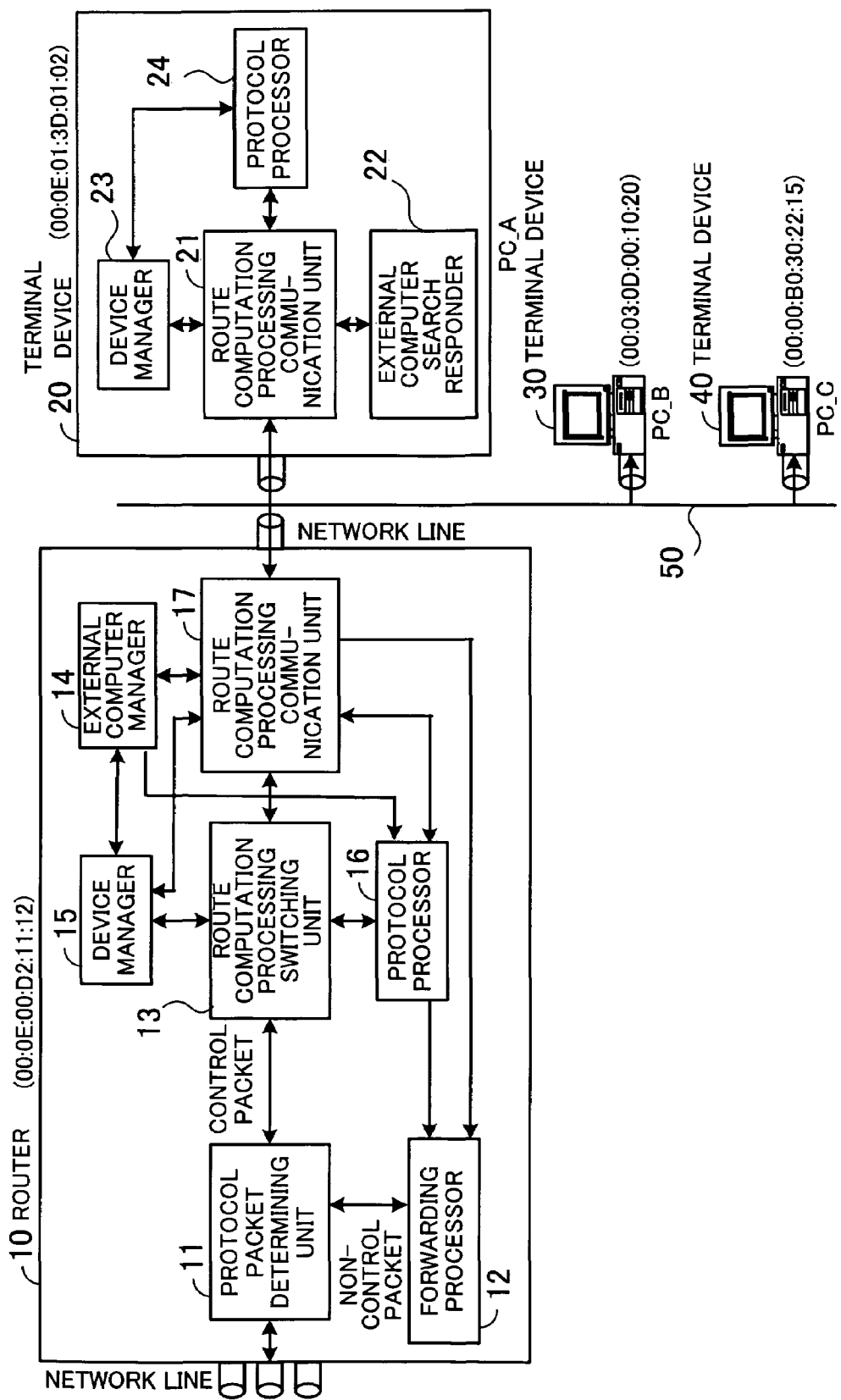
FIG. 4 is a functional block diagram of a router and a terminal device according to the first embodiment of the present invention.

FIG. 4 shows in functional block the router 10 and the terminal devices 20 through 40 according to the first embodiment of the present invention.

As shown in FIG. 4, the router 10 and the terminal devices 20 through 40 are connected to each other by a LAN (Local Area Network) 50. The router 10 has a MAC address 00:0E:00:D2:11:12, and the terminal devices 20 through 40 have respective MAC addresses 00:0E:01:3D:01:02, 00:03:0D:00:10:20, and 00:00:B0:30:22:15.

The router 10 has a protocol packet determining unit 11, a forwarding processor 12, a route computation processing switching unit 13, an external computer manager 14, a device manager 15, a protocol processor 16, and a route computation processing communication unit 17.

The protocol packet determining unit 11 determines whether a packet received from another router through a network line is a routing protocol packet (control packet) or a non-control packet sent and received between terminal devices. If it is a control packet, then the protocol packet determining unit 11 outputs the packet to the route computation processing switching unit 13. If it is a non-control packet, then the protocol packet determining unit 11 outputs the packet to the forwarding processor 12. The protocol packet determining unit 11 also sends a non-control packet that is switched in route by the forwarding processor 12 to another router.

The forwarding processor 12 has a table of destinations for non-control packets to be transferred to other routers. The forwarding processor 12 refers to the table and switches between destinations for a non-control packet that is to be output from the protocol packet determining unit 11. The table is set up and stored in a memory such as a RAM (Random Access Memory) or a HDD (Hard Disk Drive).

The route computation processing switching unit 13 switches output destinations for a control packet output from the protocol packet determining unit 11. The route computation processing switching unit 13 also switches output destinations for device information of the router 10 itself that is managed by the device manager 15. If the terminal devices 20 through 40 are connected to the router 10, then the route computation processing switching unit 13 outputs the control packet and the device information to the route computation processing communication unit 17. If the terminal devices 20 through 40 are not connected to the router 10, then the route computation processing switching unit 13 outputs the control packet and the device information to the protocol processor 16. That is, if the terminal devices 20 through 40 are connected to the router 10, then the route computation processing switching unit 13 causes the terminal devices 20 through 40 to compute routes, and if the terminal devices 20 through 40 are not connected to the router 10, then the route computation processing switching unit 13 computes a route by itself.

The external computer manager 14 periodically searches for the terminal devices 20 through 40 that are connected to the LAN 50, and collects and manages information about the terminal devices 20 through 40. At this time, the external computer manager 14 adds a tag value which is for identifying the terminal devices 20 through 40. The information about the terminal devices 20 through 40 relates to the processing capabilities of the terminal devices 20 through 40, such as CPU (Central Processing Unit) speeds, memory capacities, etc. The information about the terminal devices 20 through 40 is stored and managed in a memory such as a RAM or a HDD, for example.

The device manager 15 holds device information of the router 10 itself in a database. The device information includes a device state information indicative of port states (e.g., up or down state) of ports of the router 10, and device setup information for managing addresses assigned to the respective ports. When the device information is changed, the device manager 15 computes a route with respect to the changed device information. If the table of the forwarding processor 12 needs to be changed as a result of the computed route, then the device manager 15 registers a new forwarding entry according to the computed route in the table. The database information is stored in a memory such as a RAM or a HDD, for example. When the terminal devices 20 through 40 are searched for, the device manager 15 sends the device information to the terminal devices 20 through 40.

The protocol processor 16 holds route information in the network, e.g., information as to which router is connected next to the router 10 in a certain route. The protocol processor 16 computes a route based on the route information and the control packet output from the route computation processing switching unit 13. If the table of the forwarding processor 12 needs to be changed as a result of the computed route, then the protocol processor 16 registers a new forwarding entry according to the computed route in the table.

The route computation processing communication unit 17 communicates with the terminal devices 20 through 40 that are connected to the LAN 50. When the route computation processing communication unit 17 receives new forwarding entries calculated by the terminal devices 20 through 40, the route computation processing communication unit 17 refers to the information in the external computer manager 14, and registers only a forwarding entry sent from one of the terminal devices 20 through 40 which has the highest processing capability in the table of the forwarding processor 12.

The terminal device 20 has a route computation processing communication unit 21, an external computer search responder 22, a device manager 23, and a protocol processor 24.

The route computation processing communication unit 21 communicates with the router 10. When the route computation processing communication unit 21 is given a tag value from the router 10, the route computation processing communication unit 21 adds the tag value to a packet, and communicates with the router 10.

The external computer search responder 22 responds to a search request from the router 10, and returns information about the terminal device 20 through the route computation processing communication unit 21 to the router 10. The information about the terminal device 20 relates to processing capabilities such as a CPU speed, a memory capacity, etc., as described above with respect to the external computer manager 14. The external computer search responder 22 also holds and manages a tag value given from the router 10.

The device manager 23 holds the device information of the device manager 15 that is sent from the router 10. When the device information of the router 10 is changed, the device manager 23 sends the changed device information to the protocol processor 24. The protocol processor 24 computes a router based on the new device information. If the table of the forwarding processor 12 needs to be changed as a result of the computed route, then the protocol processor 24 sends a new forwarding entry according to the computed route to the router 10. The device information is stored in a memory such as a RAM or a HDD, for example.

The protocol processor 24 holds route information on the network. The protocol processor 24 computes a route based on the route information and the control packet sent from the router 10. If the table of the forwarding processor 12 needs to be changed as a result of the computed route, then the protocol processor 24 sends a new forwarding entry according to the computed route to the router 10.

Each of the terminal devices 30, 40 has the same functional blocks as the terminal device 20.

The data structure of a packet that is used by the external computer manager 14 to periodically search for the terminal devices 20 through 40 that are connected to the LAN 50 will be described below.

Figure 5:
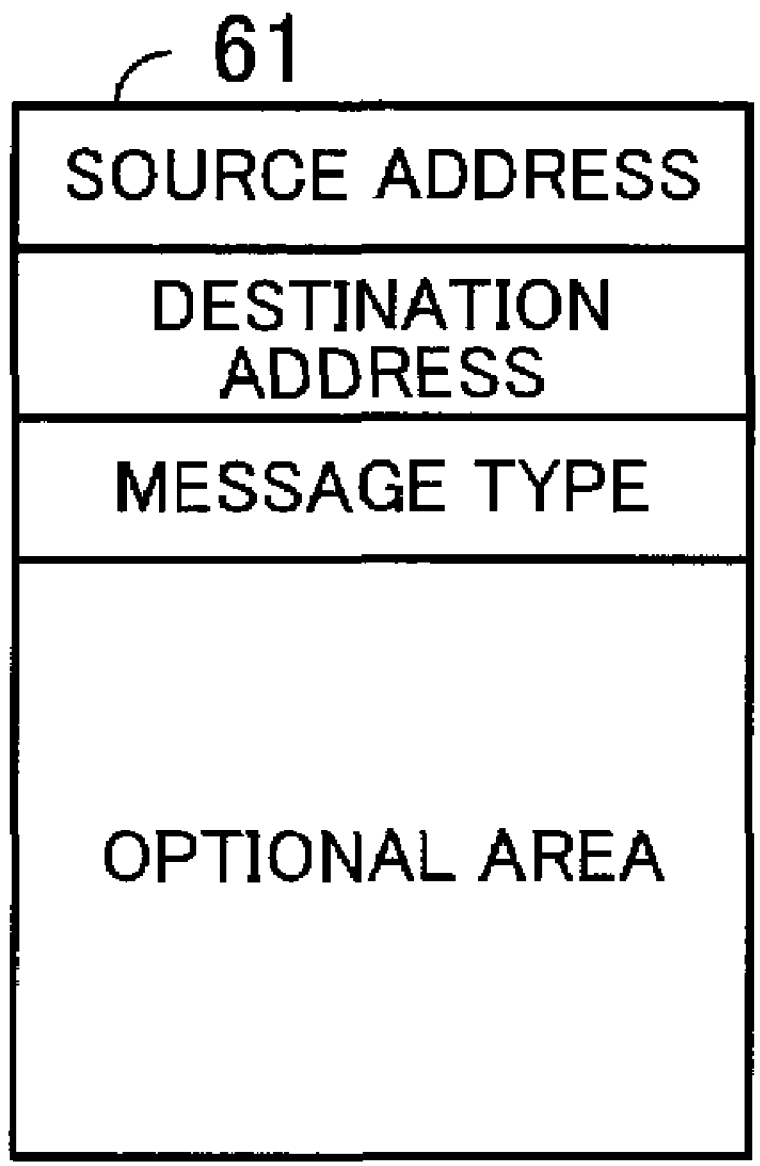

FIG. 5 shows the data structure of a packet that is sent and received when a terminal device is searched for.

As shown in FIG. 5, a packet 61 has a source address, a destination address, a message type, and an optional area.

The source address stores the MAC address of the device which sends the packet 61. If the router 10 outputs the packet 61 to search for the external terminal devices 20 through 40, then the source address stores the MAC address of the router 10. If one of the terminal devices 20 through 40 outputs the packet 61 as a response to the search request from the router 10, then the source address stores the MAC address of that terminal device.

The destination address stores the MAC address of the destination of the packet 61. If the router 10 attempts to detect terminal devices that are connected to the LAN 50, the destination address is set to a broadcasting address (FF:FF:FF:FF:FF:FF) in order to send the packet 61 to all the terminal devices. If the terminal devices 20 through 40 respond to the detection request from the router 10, then the destination address stores the MAC address of the router 10.

The message type stores information indicative of the characteristics of data that is stored in the optional area. If the message type represents 1, then it indicates that the packet 61 is used to search for the terminal devices 20 through 40, and that the optional area is not used. If the message type represents 2, then it indicates that the optional area stores data as to a response from one of the terminal devices 20 through 40 to the router 10. The stored data represents, for example, the CPU speed and the memory capacity of the terminal device. If the message type represents 3, then it indicates that a tag value is stored in the optional area.

The data structure of a packet that is sent and received between the router 10 and the terminal devices 20 through 40 if a tag value is given from the router 10 to the terminal devices 20 through 40 will be described below.

Figure 6:
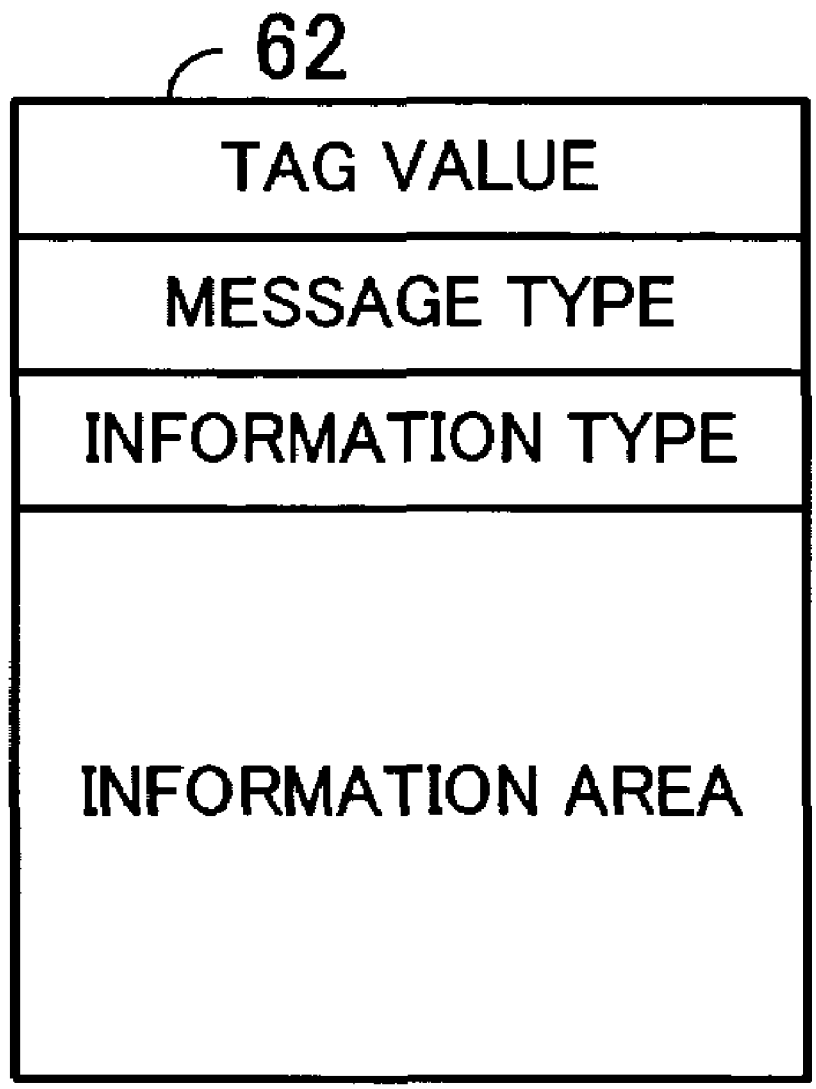
FIG. 6 is a diagram showing the data structure of a packet that is sent and received between the router and the terminal device.

FIG. 6 the data structure of a packet that is sent and received between the router 10 and a terminal device.

As shown in FIG. 6, a packet 62 has a tag value, a message type, an information type, and an information area.

The tag value stores a tag value which the router 10 has given to one of the terminal devices 20 through 40. The router 10 identifies the terminal devices 20 through 40 based on the tag value and communicates therewith.

The message type and the information type store information indicative of the characteristics of the data of information. The message type represents general characteristics of the information, and the information type represents detailed characteristics of the information.

If the message type represents 11, then it indicates that data about information is stored.

If the message type represents 12, then it indicates that data about the state of a route change is stored. If the message type represents 13, then it indicates that data about a state check of the device is stored.

If the information type represents 1, then it indicates that data about device information is stored. If the information type represents 2, then it indicates that data about route information is stored. If the information type represents 3, then it indicates that data about VPN is stored. If the information type represents 4, then it indicates that data about the load information of a CPU or the like of the terminal device is stored.

Information about the terminal devices 20 through 40 which is managed by the external computer manager 14 of the router 10 will be described below.

FIG. 7 shows the data structure of information relative to the terminal devices that is managed by the external computer manager of the router.

As shown in FIG. 7, external computer management information 63 comprises information relative to the terminal devices 20 through 40 which is managed by the external computer manager 14 of the router 10. The external computer management information 63 has columns of external computer MAC addresses, control port numbers, external computer identification tag values, router information notified states, priorities, CPUs, and memories.

The column of external computer MAC addresses stores the MAC addresses of the terminal devices 20 through 40 searched for by the external computer manager 14. The column of control port numbers stores the port numbers of connected ports of the terminal devices 20 through 40 searched for by the external computer manager 14. The column of external computer identification tag values stores tag values given to the terminal devices 20 through 40 searched for by the external computer manager 14. The column of router information notified states has subcolumns of device information and route information. The subcolumn of device information stores information indicating whether device information relative to the router 10 itself has been sent to the terminal devices 20 through 40 or not. The subcolumn of route information stores information indicating whether route information on the network has been sent to the terminal devices 20 through 40 or not. "SENT" indicates that the information has been sent, and "UNSENT" indicates that the information has not been sent. The column of priorities stores priorities with which to receive computed routes from the terminal devices 20 through 40. The priorities are determined by CPUs and memories to be described below. The column of CPUs stores CPU speeds of the terminal devices 20 through 40 searched for by the external computer manager 14. The column of memories stores memory capacities of the terminal devices 20 through 40 searched for by the external computer manager 14.

Management of tag values given to the terminal devices 20 through 40 will be described below.

FIG. 8 shows the data structure of tag value management information managed by a terminal device.

As shown in FIG. 8, tag value management information 64 includes a tag value held and managed by the external computer search responder 22 of the terminal device 20. The tag value management information 64 has columns of a router MAC address and a tag value. The tag value management information 64 is stored in a memory such as a RAM or a HDD, for example.

The column of a router MAC address stores the MAC address of the router 10 with which the terminal device 20 communicates. The column of a tag value stores a tag value given from the router 10. The route computation processing communication unit 21 refers to the tag value management information 64 managed by the external computer search responder 22, and determines a packet sent from the router 10 and addressed to the terminal device 20. The route computation processing communication unit 21 refers to the tag value management information 64, and adds a tag value to a packet to be sent to the router 10. The router 10 can judge that the source of the packet is the terminal device 20 based on the tag value 10 that is added to the packet.

Operation of the route computing system shown in FIG. 4 to search for external computers (the terminal devices 20 through 40) and also operation thereof when the router 10 receives a control packet from another router and when the device information is changed will be described below. First, operation of the route computing system to search for external computers will be described below.

The external computer manager 14 of the router 10 periodically checks if the terminal devices 20 through 40 are present on the LAN 50 or not. At this time, the external computer manager 14 generates a search message for searching for the terminal devices 20 through 40, and sends a search message transfer request to the route computation processing communication unit 17. The search message specifically comprises the packet 61 shown in FIG. 5 where the MAC address 00:0E:00:D2:11:12 of the router 10 is stored in the source address, the broadcasting address FF:FF:FF:FF:FF:FF is stored in the destination address, and 1 is stored in the message type. In response to the search message transfer request from the external computer manager 14, the route computation processing communication unit 17 broadcasts the search message to the terminal devices 20 through 40.

The route computation processing communication unit 21 of the terminal device 20 receives a frame from the LAN 50. If the frame represents the search message, then the route computation processing communication unit 21 sends a search message processing request to the external computer search responder 22. In response to the search message processing request, the external computer search responder 22 generates a search response message including information as to the terminal device 20 itself if the terminal device 20 can be used as an external computer. The information as to the terminal device 20 itself represents a CPU speed and a memory capacity, for example. The search response message specifically comprises the packet 61 shown in FIG. 5 where the MAC address 00:0E:01:3D:01:02 of the terminal device 20 is stored in the source address, the MAC address 00:0E:00:D2:11:12 of the router 10 is stored in the destination address, 2 is stored in the message type, and 2.0, 512 are stored in the optional area, where 2.0 indicates the CPU speed 2.0 GHz of the terminal device 20 and 512 indicates the memory capacity 512 Mbytes of the terminal device 20.

After having generated the search response message, the external computer search responder 22 sends a search response message sending request to the route computation processing communication unit 21 to send the search response message to the router 10. In response to the search response message sending request, the route computation processing communication unit 21 sends the search response message to the router 10.

The route computation processing communication unit 17 of the router 10 receives a frame, and, if the frame represents the search response message, i.e., if the message type is 2, sends a search response message processing request to the external computer manager 14. At this time, the route computation processing communication unit 17 delivers the received search response message and also the port number of the port that has received the search response message to the external computer manager 14. It is assumed that the port number is 120.

In response to the search response message processing request, the external computer manager 14 generates external computer management information 63 shown in FIG. 7 from the search response message that is delivered together with the search response message processing request. At this time, the external computer manager 14 determines a tag value corresponding to the MAC address of the external computer, and includes the determined tag value in the external computer management information 63. The external computer manager 14 also includes the port number (120) of the port that has received the search response message in the external computer management information 63. Since the search response message is received from the terminal device 20 in the present example, the external computer management information 63 for the terminal device 20 is given as indicated in the uppermost row shown in FIG. 7. The tag value is determined for the MAC address of each external computer.

Having determined the tag value, the external computer manager 14 generates a tag value notification message. The tag value notification message specifically comprises the packet 61 shown in FIG. 5 where the MAC address of the router 10 is stored in the source address, the MAC address of the terminal device 20 is stored in the destination address, 3 is stored in the message type, and the tag value 10 is stored in the optional area. The external computer manager 14 sends a tag value notification request to the route computation processing communication unit 17 to send the tag value notification message to the terminal device 20 that has determined the tag value. In response to the tag value notification request, the route computation processing communication unit 17 sends the tag value notification message to the terminal device 20.

The route computation processing communication unit 21 of the terminal device 20 receives a frame, and, if the frame represents the tag value notification message, i.e., if the message type is 3, sends a tag value notification processing request to the external computer search responder 22. In response to the tag value notification processing request, the external computer search responder 22 generates tag value management information 64 shown in FIG. 8 from the tag value notification message, and holds the generated tag value management information 64. When the external computer search responder 22 holds the tag value management information 64, the route computation processing communication unit 21 subsequently adds the tag value to the frame and communicates with the router 10.

When the transmission of the tag value notification message is completed, the route computation processing communication unit 17 sends a tag value notification completion to the external computer manager 14. In response to the tag value notification completion, the external computer manager 14 sends a database information notification request to the device manager 15 and the protocol processor 16 in order to send the information (the device information and the route information) held by the router 10 and required to compute a route to external computers.

In response to the database information notification request, the device manager 15 generates a database information message including the device information, and the protocol processor 16 generates a database information message including the route information. The database information message specifically comprises the packet 62 shown in FIG. 6 where 11 is stored in the message type, 1 is stored in the information type, and device information is stored in the information area, or 2 is stored in the information type, and route information is stored in the information area. The tag value is added when the database information message is sent to external computers.

The device manager 15 and the protocol processor 16 sends a database information transmission request to the route computation processing communication unit 17. In response to the database information transmission request, the route computation processing communication unit 17 adds the tag value to the database information message, and sends the database information message to the LAN 50. At this time, the route computation processing communication unit 17 sends the database information message to external computers with respect to which the router information notified state of the external computer management information 63 represents UNSENT.

The route computation processing communication unit 21 of the terminal device 20 receives a frame having a tag value addressed thereto, and removes the tag value from the frame. If the message type of the frame represents 11 and the information type thereof represents 1, then the route computation processing communication unit 21 sends a database information processing request to the device manager 23. If the information type represents 2, then the route computation processing communication unit 21 sends a database information processing request to the protocol processor 24.

In response to the database information processing request, the device manager 23 generates a database of device information from the database information message, and the protocol processor 24 generates a database of route information from the database information message. When the processing of the database information processing request is completed, the device manager 23 and the protocol processor 24 sends a database information notification completion to the router 10.

In response to the database information notification completion from the terminal device 20, the external computer manager 14 of the router 10 sets the router information notified state of the external computer management information 63 to SENT. When both the device information and the route information of the router information notified state are set to SENT, the external computer manager 14 refers to the information of the CPUs and the memories, and computes priorities of the external computers, and stores the computed priorities in the external computer management information 63. The priorities are determined by the CPU speeds and the memory capacities. For example, the priorities are determined in the descending order of CPU speeds or memory capacities.

After the priorities are determined, the external computer manager 14 sends a route computation control switching request to the route computation processing communication unit 17. In response to the route computation control switching request, the route computation processing communication unit 17 sends a route computation control switching request to the route computation processing switching unit 13. In response to the route computation control switching request, the route computation processing switching unit 13 switches to output a control packet according to the routing protocol and a device information changing notification, which is output from the device manager 15 when the device information is changed, to the route computation processing communication unit 17.

In this manner, communications are established between the external computers and the router using the tag values, allowing the external computers to perform a route computing function of the router.

Operation of the route computing system when the router 10 receives a control packet from another router and when the device information is changed will be described below.

When the protocol packet determining unit 11 of the router 10 receives a control packet according to the routing protocol from another router, the protocol packet determining unit 11 outputs the control packet to the route computation processing switching unit 13. When the device information is changed, the device manager 15 generates a device state change notification packet, and outputs it to the route computation processing switching unit 13. The device state change notification packet specifically comprises the packet 62 shown in FIG. 6 where the tag value given to one of the terminal devices 20 through 40 is stored in the tag value, 12 is stored in the message type, 1 is stored in the information type, and device state change information is stored in the information area.

If the route computation processing switching unit 13 has already received the route computation control switching request from the route computation processing communication unit 17, then the route computation processing switching unit 13 sends a control packet transfer request to the route computation processing communication unit 17, so that a control packet and a device state change notification packet are output.

In response to the control packet transfer request from the route computation processing switching unit 13, the route computation processing communication unit 17 sends an intra-device control packet (a control packet, a forwarding control packet, and a device state change notification packet are referred to as an intra-device control packet) with a tag value added thereto to external computers with respect to which the router information notified state of the external computer management information 63 represents SENT.

The route computation processing communication unit 21 of the terminal device 20 receives the intra-device control packet with the tag value added which is managed by the external computer search responder 22. The route computation processing communication unit 21 then removes the tag value from the received intra-device control packet. If the intra-device control packet is a control packet, then the route computation processing communication unit 21 sends it to the protocol processor 24. If the intra-device control packet is a device state change notification packet, then the route computation processing communication unit 21 sends it to the device manager 23.

Based on the received control packet, the protocol processor 24 recomputes a route, and updates the database of route information held thereby. If a forwarding entry needs to be registered, changed, or deleted as a result, then the protocol processor 24 generates a forwarding control packet. If a packet needs to be sent to another router, then the protocol processor 24 generates a control packet, and sends a control packet transfer request to the route computation processing communication unit 21.

The device manager 23 updates the database of device information held thereby based on the received device state change notification packet. The device manager 23 sends the changed device information to the protocol processor 24. The protocol processor 24 recomputes a route. If a forwarding entry needs to be registered, changed, or deleted as a result, then the protocol processor 24 generates a forwarding control packet, and sends a control packet transfer request to the route computation processing communication unit 21.

In response to the control packet transfer request, the route computation processing communication unit 21 adds a tag value managed by the external computer search responder 22 to the intra-device control packet, and sends the intra-device control packet to the LAN 50.

The route computation processing communication unit 17 receives an intra-device control packet with a tag value added which is managed by the external computer management information 63. At this time, the route computation processing communication unit 17 refers to priorities set in the external computer management information 63, and receives only an intra-device control packet with a tag value of highest priority which is sent from one of the terminal devices 20 through 40.

The route computation processing communication unit 17 removes the tag value from the received intra-device control packet. If the intra-device control packet is a control packet, then the route computation processing communication unit 17 sends it to the route computation processing switching unit 13. If the intra-device control packet is a forwarding control packet, then the route computation processing communication unit 17 sends it to the forwarding processor 12.

The route computation processing switching unit 13 outputs the control packet from the route computation processing communication unit 17 to the protocol packet determining unit 11, and sends it to another router.

The forwarding processor 12 registers, change, or delete a forwarding entry based on the forwarding control packet sent from the route computation processing communication unit 17.

In this manner, if a control packet is received or device information is changed, the router causes an external computer to compute a route. When the router receives the computed route, the router is able to rewrite a forwarding entry. Therefore, the computation of routes can be speeded up by replacing the external computers, and the route computing capability of the router can be speeded up inexpensively in accordance with technological advances in the external computers.

A plurality of external computers each for computing a route are connected, and in the event of a fault on them, they are successively switched into operation in the order of capabilities for increased reliability of the router.

The external computers are periodically searched for to detect any one of them which may suffer a fault. When the external computers are periodically searched, their priorities are recomputed to change the priorities in the external computer management information 63 shown in FIG. 7. Consequently, even when an external computer suffers a fault, a received intra-device control packet is processed according to new priorities, so that high computing capabilities can be maintained.

The external computers may be periodically searched for to detect a newly added external computer. At this time, priorities of the external computers are recomputed to change the priorities in the external computer management information 63. After the router 10 transfers database information to the external computers, the router 10 transfers an intra-device control packet to the newly added external computer. Therefore, the same database information is kept between the router 10 and each of the external computers.

A second embodiment of the present invention will be described below in detail with reference to the drawings.

According to the second embodiment, a route in a VPN environment is computed by external computers.

Figure 9:
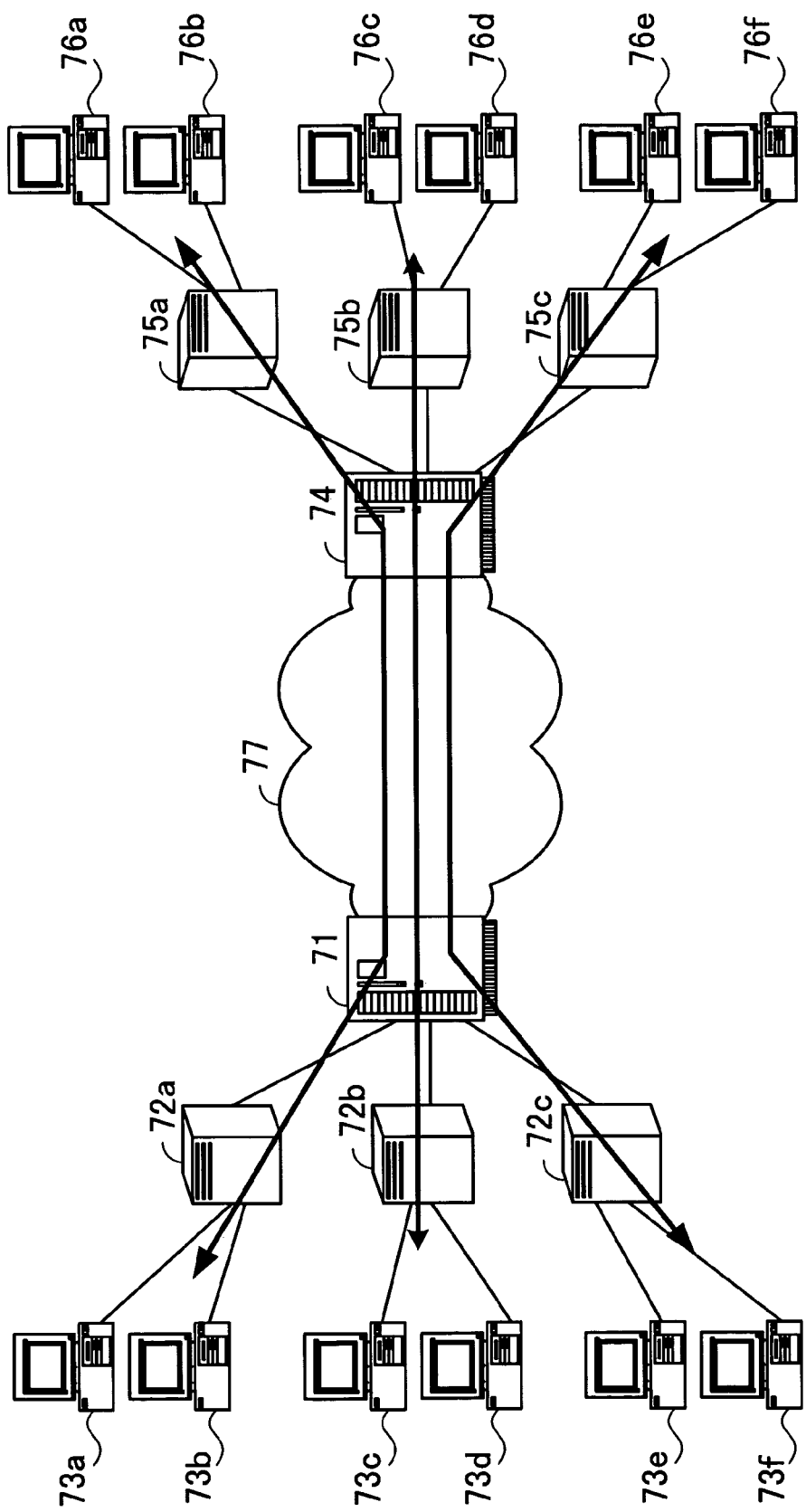
FIG. 9 is a view illustrative of VPNs.

FIG. 9 is illustrative of VPNs.

As shown in FIG. 9, routers 71, 74 are connected to each other by an IP network 77. Routers 72a through 72c that are subordinate to the router 71 are connected to the router 71. Routers 75a through 75c that are subordinate to the router 74 are connected to the router 74. Terminal devices 73a, 73b that are subordinate to the router 72a are connected to the router 72a. Terminal devices 73c, 73d that are subordinate to the router 72b are connected to the router 72b. Terminal devices 73e, 73f that are subordinate to the router 72c are connected to the router 72c. Terminal devices 76a, 76b that are subordinate to the router 75a are connected to the router 75a. Terminal devices 76c, 76d that are subordinate to the router 75b are connected to the router 75b. Terminal devices 76e, 76f that are subordinate to the router 75c are connected to the router 75c.

Three VPNs, for example, are set up in the network system shown in FIG. 9. Specifically, the terminal devices 73a, 73b, 76a, 76b make up one VPN, the terminal devices 73c, 73d, 76c, 76d make up one VPN, and the terminal devices 73e, 73f, 76e, 76f make up one VPN.

Functions of the routers and the terminal devices according to the second embodiment will be described below.

Figure 10:
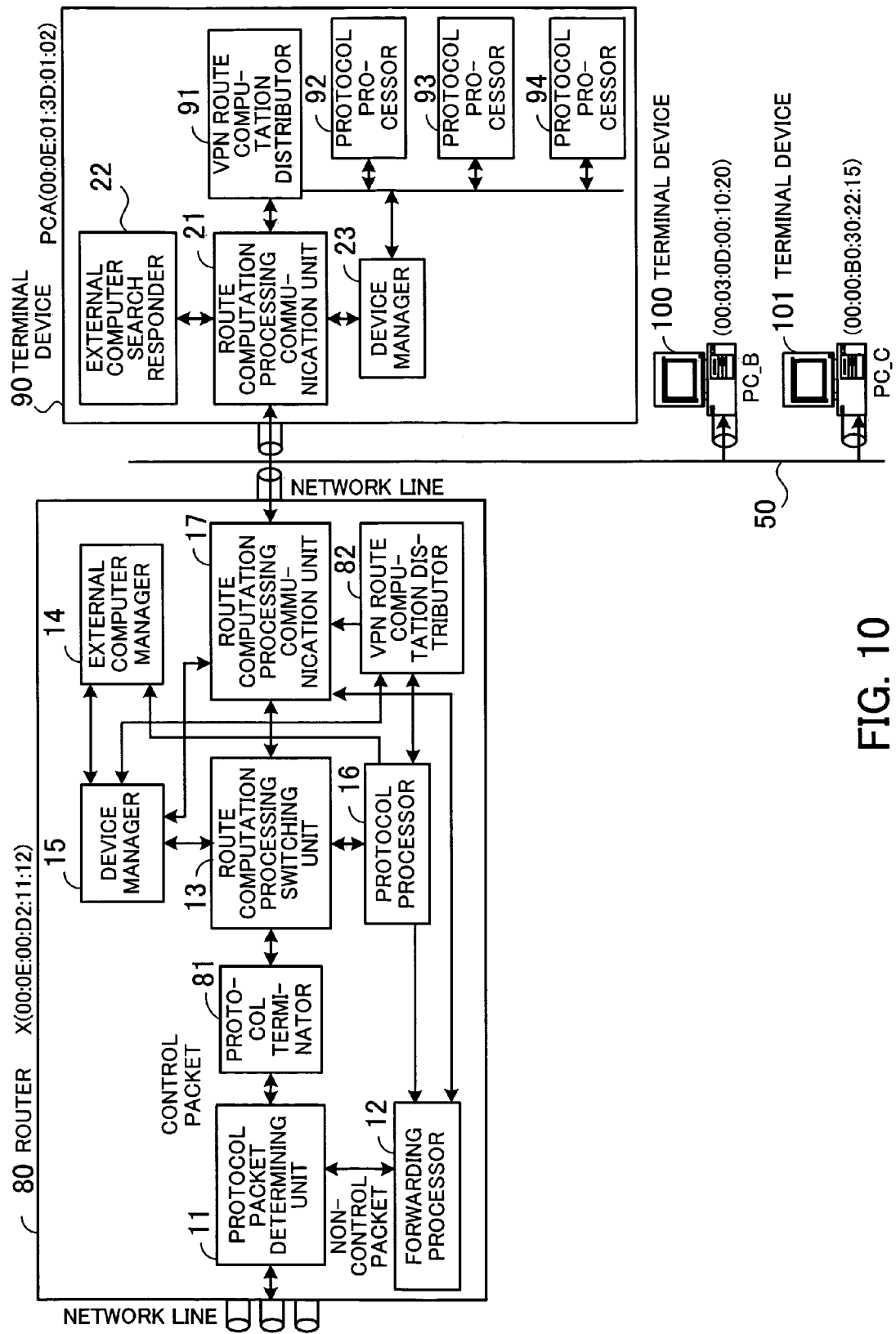
FIG. 10 is a functional block diagram of a router and a terminal device according to a second embodiment of the present invention.

FIG. 10 shows in functional block a router and terminal devices according to the second embodiment of the present invention.

Those parts shown in FIG. 10 which are identical to those shown in FIG. 4 are denoted by identical reference characters, and will not be described in detail below. As shown in FIG. 10, a router 80 has a protocol terminator 81 and a VPN route computation distributor 82 in addition to the functional components shown in FIG. 4.

The protocol terminator 81 of the router 80 terminates the connection of a control packet according to a routing protocol which is establishing a session with another router, and continues the session with the other router even if route computations for the respective VPNs are switched.

The VPN route computation distributor 82 generates a VPN route information database of VPN routes. The VPN route computation distributor 82 generates external computer VPN management information for allowing external computers to compute routes for the respective VPNs based on the VPN route information database and the external computer management information 63 shown in FIG. 7 which is generated by the external computer manager 14. The VPN route information database and the external computer VPN management information are stored in a memory such as a RAM or a HDD, for example.

A terminal device 90 has a VPN route computation distributor 91 and a plurality of protocol processors 92 through 94 in addition to the route computation processing communication unit 21, the external computer search responder 22, and the device manager 23 shown in FIG. 4. The VPN route computation distributor 91 manages information indicative of which one of the protocol processors 92 through 94 the route computation for each VPN is to be allotted to. In response to a request for the route computation for a VPN, the VPN route computation distributor 91 distributes the route computation for each VPN to the protocol processors 92 through 94.

The protocol processors 92 through 94 compute routes based on a control packet sent from the router 80. The protocol processors 92 through 94 are associated with the respective VPNs and compute routes for the respective VPNs. If the table of the forwarding processor 12 needs to be changed as a result of the computed routes, then the protocol processors 92 through 94 register a new forwarding entry in the router 80.

Other terminal devices 100, 101 have the same functional blocks as the terminal device 90.

Information of the VPNs which is managed by the router 80 will be described below.

FIG. 11 shows the data structure of a VPN route information database managed by the VPN route computation distributor of the router.

As shown in FIG. 11, the VPN route information database 111 contains information about the VPNs which is managed by the VPN route computation distributor 82 of the router 80. Specifically, the VPN route information database 111 has columns of VPN_IDs, VPN routes, neighbors, and transmission ports. The column of VPN_IDs stores identifiers assigned to the VPNs that are set up by the router 80. The column of VPN routes stores addresses assigned to the routes of the VPNs. The column of neighbors stores addresses of routers adjacent to the addresses in the left column of VPN route addresses. The columns of transmission ports stores the port numbers of ports to which the routers adjacent to the addresses in the left column of VPN route addresses are connected.

For example, the addresses of the routes of the VPNs to which VPN_IDs are assigned include 192.100.10.2, 192.100.10.5, and 192.100.10.11. The addresses of the adjacent routers connected to these addresses of the routes are 2.2.2.2, 2.2.2.2, and 3.3.3.3. The port numbers of ports to which the adjacent routers are connected are 130, 130, 122.

FIG. 12 shows the data structure of information relative to terminal devices that is managed by the VPN route computation distributor of the router.

As shown in FIG. 12, external computer VPN management information 112 comprises information relative to the terminal devices 90, 100, 101 which is managed by the VPN route computation distributor 82. The external computer VPN management information 112 has columns of external computer MAC addresses, external computer identification tag values, router information notified states, processing VPN_IDs, CPUs, and memories.

The column of external computer MAC addresses stores the MAC addresses of the terminal devices 90, 100, 101 connected to the router 80. The column of external computer identification tag values stores tag values given to the terminal devices 90, 100, 101 connected to the router 80. The column of router information notified states has subcolumns of device information and route information. The subcolumn of device information stores information indicating whether device information relative to the router 80 itself has been sent to the terminal devices 90, 100, 101 or not. The subcolumn of route information stores information indicating whether route information on the VPN has been sent to the terminal devices 90, 100, 101 or not. "SENT" indicates that the information has been sent, and "UNSENT" indicates that the information has not been sent. The column of processing VPN_IDs store the VPN_IDs of VPNs whose routes are computed by the terminal devices 90, 100, 101. The column of CPUs stores CPU speeds of the terminal devices 90, 100, 101 connected to the router 80. The column of memories stores memory capacities of the terminal devices 90, 100, 101 connected to the router 80.

Management of tag values of the terminal devices 90, 100, 101 will be described below.

FIG. 13 shows the data structure of tag value management information managed by a terminal device.

As shown in FIG. 13, tag value management information 113 includes a tag value held and managed by the VPN route computation distributor 91 of the terminal device 90. The tag value management information 113 has columns of a router MAC address, a tag value, VPN_IDs, and protocol processes. The tag value management information 113 is stored in a memory such as a RAM or a HDD, for example.

The column of a router MAC address stores the MAC address of the router 80 with which the terminal device 90 communicates. The column of a tag value stores a tag value given from the router 80. The column of VPN_IDs stores identifiers assigned to VPNs. The column of protocol processes stores the names of processes for computing routes of the VPN_IDs in the left column.

Operation of the route computing system shown in FIG. 10 to search for external computers (the terminal devices 90, 100, 101) and also operation thereof when the router 80 receives a control packet from another router and when the device information is changed will be described below. First, operation of the route computing system to search for external computers will be described below.

The router 80 operates to generate a search message to search for the terminal devices 90, 100, 101 and assign tag values in the same manner as with the first embodiment. Subsequent operation will be described below. The router 80 computes route information with its own protocol processor 16 until VPN routes are stabilized. When VPN routes have become stable for a certain period of time, the protocol processor 16 sends a database generation request to the VPN route computation distributor 82. At this time, the protocol processor 16 sends route information obtained for each VPN to the VPN route computation distributor 82.

In response to the database generation request, the VPN route computation distributor 82 generates a VPN route information database 111 as shown in FIG. 11. After having generated the VPN route information database 111, the VPN route computation distributor 82 generates external computer VPN management information 112 as shown in FIG. 12 where VPN_IDs having more routes are assigned to external computers of higher CPU performance, based on the performance of external computers represented by the external computer management information generated by the external computer manager 14 and the numbers of routes of VPNS in the generated VPN route information database 111. At this time, the VPN route computation distributor 82 determines tag values for the respective external computers. If the number of VPNs is greater than the number of external computers, then the performance of the external computers and the number of routes of each VPN are compared with each other, and a plurality of VPNs to be computed are associated with each of the external computers such that the number of routes of VPNs is distributed in proportion to the performance of the external computers.

After having determined the tag values, the VPN route computation distributor 82 refers to the external computer VPN management information 112 and generates a tag value notification message and sends a tag value notification request to the route computation processing communication unit 17. In response to the tag value notification request, the route computation processing communication unit 17 sends the tag value notification message, which is sent together with the tag value notification request, to the terminal devices 90, 100, 101.

The tag value notification message includes a tag value assigned to a terminal device and a VPN identifier assigned from the router 80 for causing the protocol processor of the terminal device to compute a route. The tag value notification message specifically comprises the packet 61 shown in FIG. 5 where the MAC address 00:0E:00:D2:11:12 of the router 80 is stored in the source address, the MAC address 00:0E:01:3D:01:02 of the terminal device 90 is stored in the destination address, 3 is stored in the message type, and a tag value 20 and VPN_IDs 2, 5 are stored in the optional area.

The route computation processing communication unit 21 of the terminal device 90 receives a frame. If the frame represents the tag value notification message, i.e., if the message type is 3, with a VPN_ID in the optional area, then the route computation processing communication unit 21 sends a tag value notification processing request to the VPN route computation distributor 91.

In response to the tag value notification processing request, the VPN route computation distributor 91 generates the tag value management information 113 shown in FIG. 13 from the tag value notification message. After having generated the tag value management information 113, the VPN route computation distributor 91 activates the protocol processors 92 through 94 for calculating respective VPN routes. The protocol processors 92 through 94 compute routs of plural VPNs parallel to each other. After having activated the protocol processors 92 through 94, the VPN route computation distributor 91 sends a tag value notification completion to the route computation processing communication unit 21.

In response to the tag value notification completion, the route computation processing communication unit 21 subsequently adds the tag value shown in FIG. 13 to the frame and communicates with the router 80.

When the transmission of the tag value notification message is completed, the route computation processing communication unit 17 sends a tag value notification completion to the VPN route computation distributor 82.

In response to the tag value notification completion, the VPN route computation distributor 82 sends a database information notification request to the device manager 15 in order to send the device information and the route information held by the router 80 to external computers.

In response to the database information notification request, the device manager 15 generates a database information message including the device information, and sends a database information notification request to the route computation processing communication unit 17. The database information message specifically comprises the packet 62 shown in FIG. 6 where the tag value assigned to the terminal device to which the database information message is to be sent is stored in the tag value, 11 is stored in the message type, 1 is stored in the information type, and device information is stored in the information area.

In response to the database information notification request, the VPN route computation distributor 82 generates a database information message including the information of the VPN route information database 111, and sends a database information notification request to the route computation processing communication unit 17. the database information message specifically comprises the packet 62 shown in FIG. 6 where the tag value assigned to the terminal device to which the database information message is to be sent is stored in the tag value, 11 is stored in the message type, 3 is stored in the information type, and a VPN_ID and information of the VPN route information database 111 which corresponds to the VPN_ID are stored in the information area.

In response to the database information notification request from the device manager 15, the route computation processing communication unit 17 sends the database information message to external computers with respect to which the router information notified state of the external computer VPN management information 112 represents UNSENT. In response to the database information notification request from the VPN route computation distributor 82, the route computation processing communication unit 17 sends the database information message to external computers with respect to which the router information notified state of the external computer VPN management information 112 represents UNSENT.

The route computation processing communication unit 21 of the terminal device 90 receives a frame, and removes the tag value from the frame. If the message type of the frame represents a database information message, i.e., if it represents 11, then the route computation processing communication unit 21 refers to the information type. If the information type represents 1, i.e., if it represents device information, then the route computation processing communication unit 21 sends a database information processing request to the device manager 23. If the information type represents 3, i.e., if it represents VPN route information, then the route computation processing communication unit 21 sends a database information processing request to the VPN route computation distributor 91.

In response to the database information processing request, the device manager 23 generates database information of device information.

In response to the database information processing request, the VPN route computation distributor 91 acquires a VPN_ID from the information area of the received message, sends a database information processing request to the protocol processors 92 through 94 which have corresponding processes of the tag value management information 113.

In response to the database information processing request, the protocol processors 92 through 94 generate a database similar to the VPN route information database 111.

When the database information notification request is completed, the device manager 15 of the router 80 sends a database information notification completion to the VPN route computation distributor 82. In response to the database information notification completion, the VPN route computation distributor 82 updates the subcolumn of device information in the external computer VPN management information 112 shown in FIG. 12 to "SENT".

Similarly, when the database information notification request is completed, the VPN route computation distributor 82 updates the subcolumn of route information in the external computer VPN management information 112 to "SENT". After the subcolumns of device information and route information in the external computer VPN management information 112 have been updated to "SENT", the VPN route computation distributor 82 sends a route computation control switching request to the route computation processing communication unit 17. In response to the route computation control switching request, the route computation processing communication unit 17 sends it to the route computation processing switching unit 13.

In response to the route computation control switching request, the route computation processing switching unit 13 switches to output a control packet according to the routing protocol and a device information changing notification that is output from the device manager 15 when the device information is changed, to the route computation processing communication unit 17. The route computation processing switching unit 13 also sends a route computation control switching request to the protocol terminator 81. In response to the route computation control switching request, the protocol terminator 81 terminates the received control packet, and starts managing and keeping session information of the control packet.

In this manner, communications are established between the external computers and the router using the tag values, allowing the external computers to perform a VPN route computing function of the router.

Operation of the route computing system when the router 80 receives a control packet from another router and when the device information is changed will be described below.

The protocol packet determining unit 11 of the router 80 receives a control packet from another router and outputs the control packet to the protocol terminator 81.

When the protocol terminator 81 receives the control packet, if it has already received the route computation control switching request, then the protocol terminator 81 terminates the session information of the received control packet, and manages and keeps the session information. Then, the protocol terminator 81 sends the control packet to the route computation processing switching unit 13.

When a change occurs in the information representative of the device state and the device configuration, the device manager 15 generates a device state change notification packet including the device information and outputs it to the route computation processing switching unit 13.

If the route computation processing switching unit 13 has received a route computation control switching request from the route computation processing communication unit 17 and if the received packet is a control packet, then the route computation processing switching unit 13 determines whether the VPN_ID of the control packet has been registered in the external computer VPN management information 112 or not. If the VPN_ID has been registered in the external computer VPN management information 112, then the route computation processing switching unit 13 confirms whether the device information and the route information of the router information notified state have been set to "SENT" or not. If both the device information and the route information have been set to "SENT", then the route computation processing switching unit 13 sends the control packet to the route computation processing communication unit 17 and sends a control packet transfer request thereto. If the received packet is a device state change notification packet, then the route computation processing switching unit 13 does not refer to the external computer VPN management information 112 and sends a control packet transfer request to the route computation processing communication unit 17.

In response to the control packet transfer request from the route computation processing switching unit 13, if the received packet is a control packet, then the route computation processing communication unit 17 refers to the external computer VPN management information 112, acquires the tag value corresponding to the VPN_ID of the control packet, adds the tag value to the control packet, and sends the control packet to the LAN 50. If the received packet is a device state change notification packet, then the route computation processing communication unit 17 makes as many copies of the device state change notification packet as the number of external computers with respect to which the router information notified state of the external computer VPN management information 112 represents SENT, adds the corresponding tag value to the copies, and sends the copies to the LAN 50.

The route computation processing communication unit 21 of the terminal device 90 receives a packet to which the tag value from the tag value management information 113 managed by the VPN route computation distributor 91 is added. The route computation processing communication unit 21 removes the tag value from the received packet. If the received packet is a control packet, then the route computation processing communication unit 21 outputs it to the VPN route computation distributor 91. If the received packet is a device state change notification packet, then the route computation processing communication unit 21 outputs it to the device manager 23.

The VPN route computation distributor 91 acquires a VPN_ID from the received control packet, and searches for a process (the protocol processors 92 through 94) for processing the control packet from the tag value management information 113. The VPN route computation distributor 91 outputs the control packet to the process that has been searched for.

Based on the received control packet, the protocol processors 92 through 94 recompute a route, and updates the route information that is held thereby. If a forwarding entry needs to be registered, changed, or deleted as a result, then the protocol processors 92 through 94 generate a forwarding control packet. If a packet needs to be sent to another router, then the protocol processors 92 through 94 generate a control packet, and send a control packet information notification request to the VPN route computation distributor 91.

In response to the control packet information notification request, the VPN route computation distributor 91 refers to the tag value management information 113, acquires a VPN_ID from the forwarding control packet or the control packet generated by the protocol processors 92 through 94, and outputs the VPN_ID together with a control packet transfer request to the route computation processing communication unit 21.

The device manager 23 updates the database of device information held thereby based on the received device state change notification packet. The device manager 23 recomputes a route with the changed device information. If a forwarding entry needs to be registered, changed, or deleted as a result, then the device manager 23 generates a forwarding control packet, and sends a control packet transfer request to the route computation processing communication unit 21.

In response to the control packet transfer request, the route computation processing communication unit 21 adds the tag value of the tag value management information 113 to an intra-device control packet (a forwarding control packet from the VPN route computation distributor 91, a control packet, or a forwarding control packet from the device manager 23), and sends the intra-device control packet to the LAN 50.

The route computation processing communication unit 17 of the router 80 receives the intra-device control packet with the tag value added which is managed by the external computer VPN management information 112, from the external computer. The route computation processing communication unit 17 then removes the tag value from the received intra-device control packet. If the intra-device control packet is a control packet, then the route computation processing communication unit 17 sends it to the VPN route computation distributor 82. If the intra-device control packet is a forwarding control packet, then the route computation processing communication unit 17 sends it to the forwarding processor 12.

The VPN route computation distributor 82 rewrites the VPN route information database 111 based on the control packet that is received by the route computation processing communication unit 17. The forwarding processor 12 registers, changes, or deletes the forwarding entry based on the forwarding control packet that is received by the route computation processing communication unit 17.

In this manner, if a control packet is received or device information is changed, the router 80 causes an external computer to computer a route, and is able to rewrite a forwarding entry. The computation of routes of VPNs can be speeded up by distributing the computing of routes of VPNs by the router 80 to a plurality of external computers depending on the number of routes of VPNs.

The external computers are periodically searched for to detect any one of them which may suffer a fault. When an external computer suffering a fault is detected, another terminal device is caused to compute a VPN route. Specifically, the faulty external computer is deleted from the external computer VPN management information 112. The route computation that has been performed by the faulty external computer is taken over by the protocol processor 16 of the router 80. While the protocol processor 16 is computing a route, the VPN route computation distributor 82 selects an external computer under a smallest load from all the external computers that are registered in the external computer VPN management information 112. Subsequently, the same process as the process of detecting an external computer is performed to send the device information and the VPN route information to the selected external computer to enable the selected external computer to compute a VPN route.

The external computers may be periodically searched for to detect a newly added external computer. Specifically, the same process as the process of detecting an external computer is performed on a newly added external computer, and external computer VPN management information 112 is updated. After the completion of the transfer of the database information message, the router 80 transfers an intra-device control packet to the newly added external computer for computing a route in the same manner as with each external computer.

The router 80 can further conduct a load investigation against an external computer. Specifically, the VPN route computation distributor 82 of the router 80 periodically generates a load investigation message, and transfers the load investigation message to the route computation processing communication unit 17 to make a load investigation request. In response to the load investigation request, the route computation processing communication unit 17 adds the tag values corresponding to the respective external computers to the load investigation message, and sends the load investigation message to the LAN 50. The load investigation message specifically comprises the packet 62 shown in FIG. 6 where the tag value of an external computer (the terminal device 90) against which the load investigation is to be conducted is stored in the tag value, 13 is stored in the message type, and 4 is stored in the information type.

The route computation processing communication unit 21 of the terminal device 90 receives the message from the router 80, and removes the tag value from the message. If the message type represents 13 and the information type thereof represents 4, then the route computation processing communication unit 21 outputs the received message to the VPN route computation distributor 91. In response to the load investigation message, the VPN route computation distributor 91 investigates the utilization rate of the CPU and the utilization rate of the memory. After the investigation, the VPN route computation distributor 91 generates a load investigation response message, and sends a load investigation message response request to the route computation processing communication unit 21. In response to the load investigation message response request, the route computation processing communication unit 21 refers to the tag value management information 113, adds a tag value to the generated load investigation response message, and sends the load investigation response message to the LAN 50. The load investigation response message specifically comprises the packet 62 shown in FIG. 6 where the tag value of the terminal device 90 is stored in the tag value, 13 is stored in the message type, 4 is stored in the information type, and the utilization rates of the CPU and the memory, e.g., 70% and 50%, respectively, are stored in the information area.

The route computation processing communication unit 17 of the router 80 receives the load investigation response message, and removes the tag value therefrom. Then, the route computation processing communication unit 17 outputs the received load investigation response message to the VPN route computation distributor 82. The VPN route computation distributor 82 multiplies the number of VPN routes in the VPN route information database 111 by the loads from the load information that is indicated, assigns external computers of higher performance again to greater numbers of routes, and changes the external computer VPN management information 112. When a processing external computer is changed or when a new processing external computer is added, the above load-dependent distribution process can be performed after the above process of periodically searching for external computers.

A third embodiment of the present invention will be described below in detail with reference to the drawings.

According to the third embodiment, a single external computer computes routes for a plurality of routers.

Figure 14:
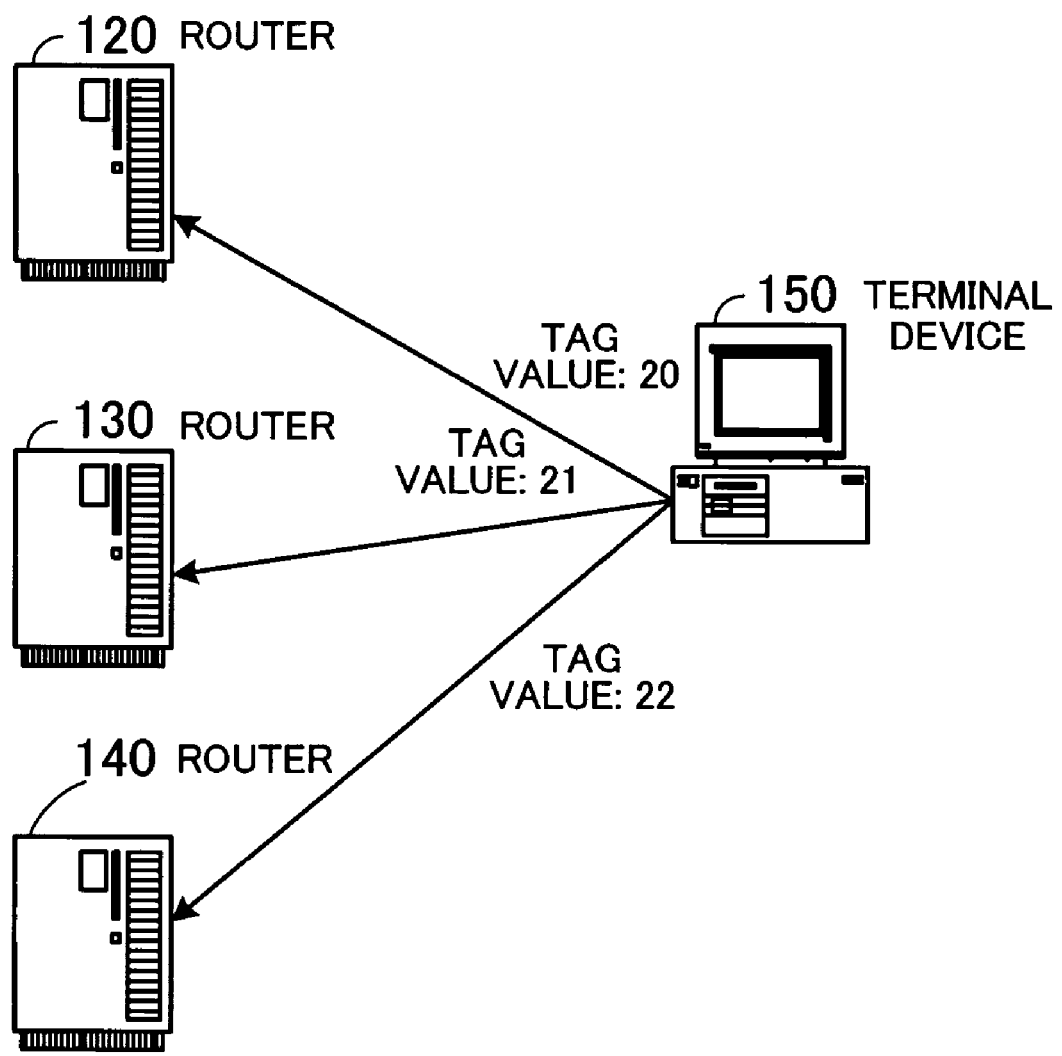
FIG. 14 is a view showing an arrangement of a route computing system according to a third embodiment of the present invention.

FIG. 14 shows an arrangement of a route computing system according to the third embodiment of the present invention.

As shown in FIG. 14, routers 120 through 140 are connected to a terminal device 150. As with the first embodiment, the routers 120 through 140 output respective search messages to search for an externally connected terminal device. In response to the search messages sent from the routers 120 through 140, the terminal device 150 generates tag values for identifying the respective routers 120 through 140, and sends the tag values to the routers 120 through 140. In FIG. 14, the terminal device 150 sends a tag value 20 to the router 120, sends a tag value 21 to the router 130, and a tag value 22 to the router 140.

After the tag values are generated and assigned to the routers 120 through 140, the routers 120 through 140 and the terminal device 150 communicate with each other using the tag values. If a need arises for recomputing routes, then the routers 120 through 140 send route computation requests to the terminal device 150, which computes routes alone. According to the third embodiment, the terminal device 150 has a high processing capability and computes routes for the plural routers 120 through 140 alone.

Communications based on tag values will be described below.

Figure 15:
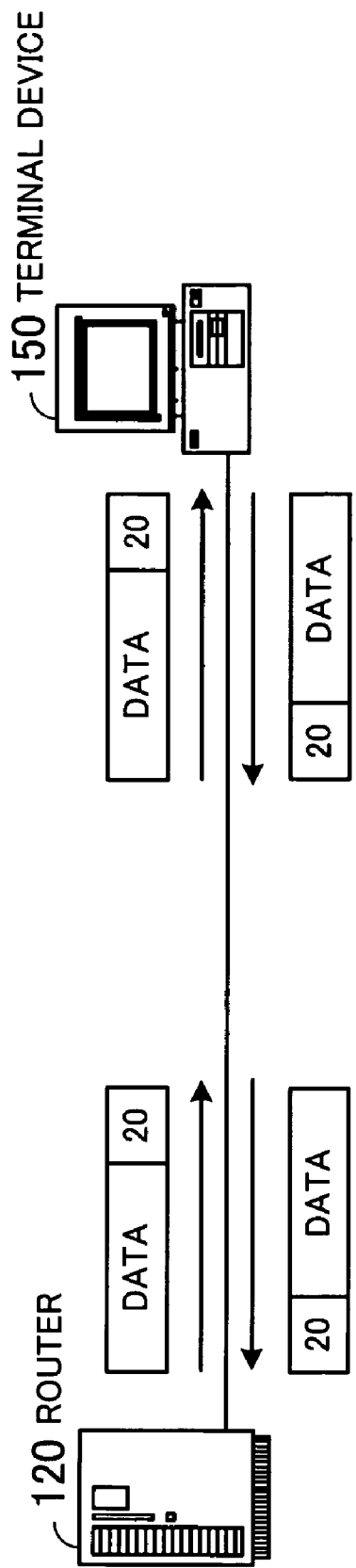
FIG. 15 is a view illustrative of communications based on tag values.

FIG. 15 illustrates communications based on tag values.

FIG. 15 shows the router 120 and the terminal device 150 which are illustrated in FIG. 14. For communicating with the router 120, the terminal device 150 adds a tag value 20 assigned to the router 120 to the beginning end of data of a packet. The router 120 refers to the tag value 20 assigned from the terminal device 150, and recognizes that the packet is addressed to the router 120. For communicating with the terminal device 150, the router 120 adds the tag value 20 assigned from the terminal device 150 to the beginning end of data of a packet. The terminal device 150 refers to the tag value 20 assigned to the router 120, and recognizes that the packet is addressed to the terminal device 150.

Functions of the routers 120 through 140 and the terminal device 150 according to the third embodiment will be described below.

Figure 16:
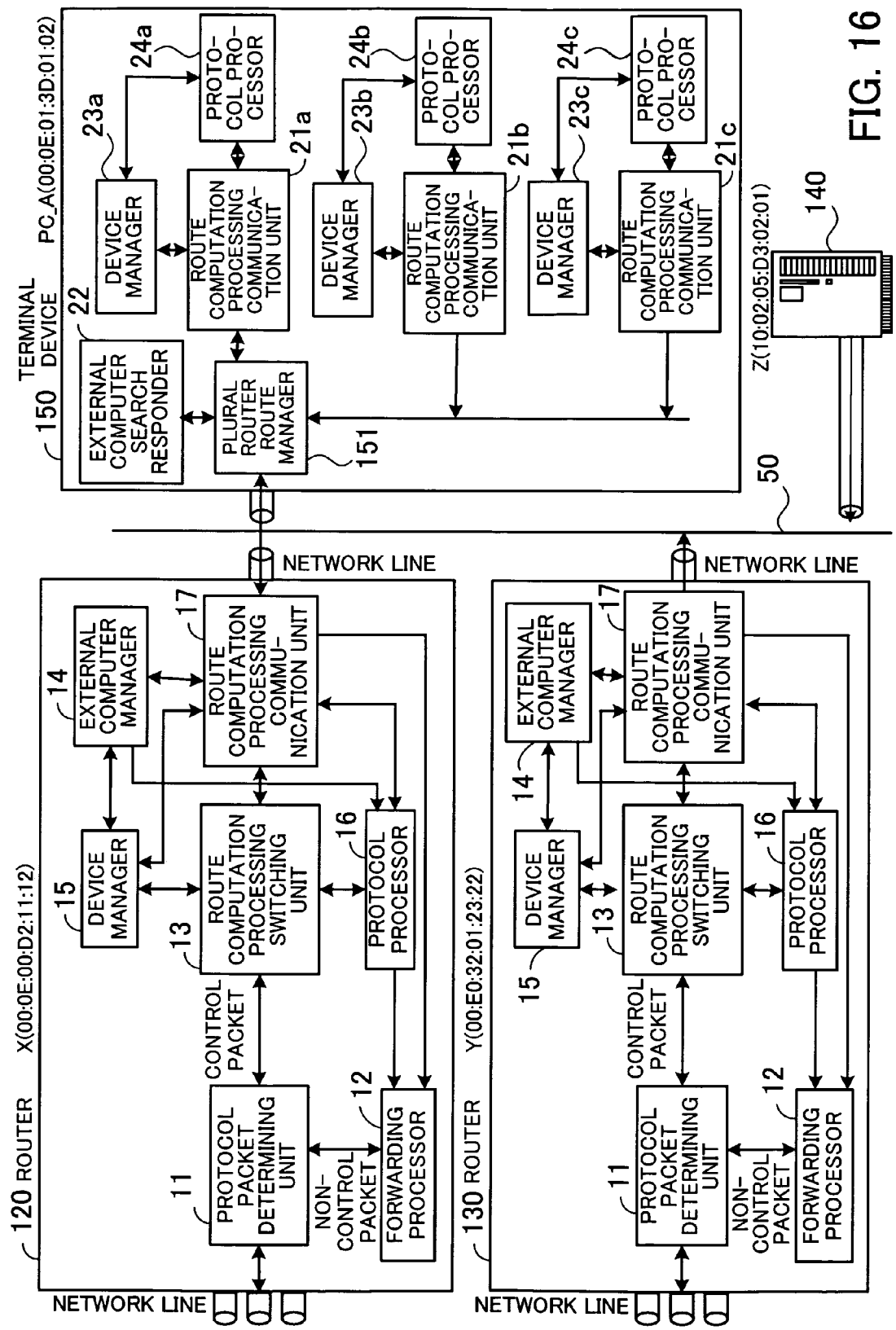
FIG. 16 is a functional block diagram of routers and a terminal device according to the third embodiment of the present invention.

FIG. 16 shows in functional block diagram of the routers 120 through 140 and the terminal device 150 according to the third embodiment.

In FIG. 16, the router 120 is named "X" and has a MAC address 00:0E:00:D2:11:12. The router 130 is named "Y" and has a MAC address 00:E0:32:01:23:22. The router 140 is named "Z" and has a MAC address 10:02:05:D3:02:01. The terminal device 150 is named "PC_A" and has a MAC address 00:0E:01:3D:01:02.

Each of the routers 120, 130 has the same functional blocks as the router 10 shown in FIG. 4, and those functional blocks are denoted by identical reference characters and will not be described in detail below. The router 140 also has the same functional blocks as the routers 120, 130.

The terminal device 150 has route computation processing communication units 21a through 21c, an external computer search responder 22, device managers 23a through 23c, protocol processors 24a through 24c, and a plural router route manager 151. The route computation processing communication units 21a through 21c, the external computer search responder 22, the device managers 23a through 23c, and the protocol processors 24a through 24c are identical to the route computation processing communication unit 21, the external computer search responder 22, the device manager 23, and the protocol processor 24 shown in FIG. 4, and will not be described in detail below.

The plural router route manager 151 communicates with the plural routers 120 through 140. The plural router route manager 151 manages the device information of the routers 120 through 140 and the route information of the network.

Management of tag values by the plural router route manager 151 will be described below.

FIG. 17 shows the data structure of tag value management information managed by the terminal device.

In FIG. 17, tag value management information 161 includes tag values held and managed by the plural router route manager 151. The tag value management information 161 has columns of router MAC addresses, tag values, and management data information. The tag value management information 161 is stored in a memory such as a RAM or a HDD, for example.

The column of router MAC addresses stores the MAC addresses of the routers 120 through 140 with which the terminal device 150 communicates. The column of tag values stores tag values that are assigned to the routers 120 through 140 by the plural router route manager 151. The column of management data information stores the names of processes for computing routes for the routers 120 through 140. Each of the processes serves as a unit for processing a route computation. Specifically, in FIG. 16, the route computation processing communication unit 21a, the device manager 23a, and the protocol processor 24a jointly serve as a unit for computing a route, the route computation processing communication unit 21b, the device manager 23b, and the protocol processor 24b jointly serve as a unit for computing a route, and the route computation processing communication unit 21c, the device manager 23c, and the protocol processor 24c jointly serve as a unit for computing a route.

Operation of the route computing system shown in FIG. 16 to search for external computers and also operation thereof when the routers 120 through 140 receive a control packet from another router and when the device information is changed will be described below. First, operation of the route computing system to search for external computers will be described below.

The routers 120 through 140 operate to send a search message to search for an external computer on the LAN 50 in the same manner as with the first embodiment. Subsequent operation will be described below.

The plural router route manager 151 of the terminal device 150 receives a frame, and, if the frame represents a search message, i.e., if the message type of the packet 61 shown in FIG. 5 is 1, sends a search message processing request to the external computer search responder 22.

In response to the search message processing request, the external computer search responder 22 generates a search response message including computer information, e.g., information about the MAC address, the CPU, and the memory, if the terminal device 150 can be used as an external computer. The search response message specifically comprises the packet 61 shown in FIG. 5 where the MAC address 00:0E:01:3D:01:02 of the terminal device 150 is stored in the source address, the MAC address 00:0E:00:D2:11:12 of the router 120 is stored in the destination address, 2 is stored in the message type, and 2.0 (GHz) indicative of the CPU speed and 512 (Mbytes) indicative of the memory capacity are stored in the optional area. After having generated the search response message, the external computer search responder 22 sends a search message response request to the plural router route manager 151.

In response to the search message response request, the plural router route manager 151 determines a tag value for the source address of the search response message sent from the external computer search responder 22. Then, the plural router route manager 151 generates tag value management information 161 shown in FIG. 17. The plural router route manager 151 sends the search response message where the determined tag value is stored in the optional area, to the router 120. After having generated the tag value management information 161, the plural router route manager 151 activates the route computation processing communication units 21a through 21c that correspond respectively to the routers 120 through 140. The route computation processing communication units 21a through 21c perform route computing processes of the routers 120 through 140 parallel to each other.

In this manner, the terminal device 150 receives search messages from the respective routers 120 through 140, and determines tag values for the respective source addresses of the search messages. Then, the terminal device 150 sends the tag values to the respective routers 120 through 140 for subsequently recognizing which one of the routers 120 through 140 information is transferred from.

The route computation processing communication unit 17 of the router 120 receives a frame, and, if the frame represents a search response message, i.e., if the message type is 2, sends a search response message processing request to the external computer manager 14. At this time, the route computation processing communication unit 17 delivers reception port information (it is assumed that the reception port number is 120) and the received message to the external computer manager 14.

In response to the search response message processing request, the external computer manager 14 generates external computer management information 63 shown in FIG. 7 from the delivered information. At this time, if a tag value is stored in the optional area of the message, then the external computer manager 14 stores the tag value in the column of external computer identification tag values of the external computer management information 63. The external computer manager 14 also stores 120 in the column of control port numbers. According to the third embodiment, since only one external computer is employed, the two rows from the bottom of the external computer management information 63 are not generated.

In order to transfer the device information and the route information that are held by the router 120 to the terminal device 150, the external computer manager 14 sends a database information notification request to the device manager 15 and the protocol processor 16.

In response to the database information notification request, the device manager 15 and the protocol processor 16 generates a database information message including the device information and a database information message including the route information, and send a database information notification request to the route computation processing communication unit 17.

In response to the database information notification request, the route computation processing communication unit 17 refers to the external computer management information 63, and sends a database information message with a tag value added to the external computer with respect to which the router information notified state is "UNSENT". The database information message specifically comprises the packet 62 shown in FIG. 6 where 20 assigned from the terminal device 150 is stored in the tag value, 11 is stored in the message type, 1 is stored in the information type, and the device information is stored in the information area, or alternatively 2 is stored in the information type, and the route information is stored in the information area.

The plural router route manager 151 of the terminal device 150 receives a frame, and removes the tag value from the frame. In order to determine a processing one of the route computation processing communication units 21a through 21c from the tag value, the plural router route manager 151 refers to the tag value management information 161, and outputs a frame to one of the route computation processing communication units 21a through 21c which corresponds to the management data information.

If the message type of the frame represents a database information message, i.e., if the message type is 11, then the route computation processing communication units 21a through 21c refer to the information type. If the information type represents the device information, i.e., the information type is 1, then the route computation processing communication units 21a through 21c send a database information processing request to the device managers 23a through 23c. If the information type represents the route information, i.e., the information type is 2, then the route computation processing communication units 21a through 21c send a database information processing request to the protocol processors 24a through 24c.

In response to the database information processing request, the device managers 23a through 23c generate a database of device information from the received database information message. In response to the database information processing request, the protocol processors 24a through 24c generate a database of route information from the received database information message.

When the database information notification request is completed, the device manager 15 and the protocol processor 16 of the router 120 send a database information notification completion to the external computer manager 14. In response to the database information notification completion, the external computer manager 14 updates the router information notified state of the external computer management information 63 to "SENT". After both the device information and the route information of the router information notified state of the external computer management information 63 have been updated to "SENT", the external computer manager 14 sends a route computation control switching request to the route computation processing communication unit 17.

In response to the route computation control switching request, the route computation processing communication unit 17 sends a route computation control switching request to the route computation processing switching unit 13.

In response to the route computation control switching request, the route computation processing switching unit 13 switches to output a control packet according to the routing protocol and a device information changing notification, which is output from the device manager 15 when the device information is changed, to the route computation processing communication unit 17.

In this manner, communications are established between the terminal device 150 and the router 120 using the tag value, allowing the single terminal device 150 to compute routes for the routers 120 through 140. With regard to operation of the route computing system when the routers 120 through 140 receive a control packet from another router and when the device information is changed, the processes of the single terminal device 150 compute respective routes for the routers 120 through 140. The processes are equivalent to a plurality of operation sequences of the router 10 and the terminal device 20 described above with respect to the first embodiment, and will not be described below.

In this manner, even though a plurality of external computers are not employed, one high-performance external computer is used to compute each of routes at a high speed at a low cost.

When the terminal device 150 suffers a fault, the routers 120 through 140 compute routes. Specifically, the external computer manager 14 deletes the information of the external computer from which no search response message has been sent for a certain period of time, from the external computer management information 63. When the information of the external computer registered in the external computer management information 63 is deleted, the external computer manager 14 sends a route computation control return request to the route computation processing communication unit 17. In response to the route computation control return request, the route computation processing communication unit 17 sends a route computation control return request to the route computation processing switching unit 13. In response to the route computation control return request, the route computation processing switching unit 13 outputs a control packet and a notification representing information about a change in the device state and the device configuration to the protocol processor 16. Thus, in the event of a fault of the terminal device 150, routes are computed by the routers 120 through 140.

If the plural router route manager 151 of the terminal device 150 fails to receive periodic search messages from a certain router for a certain period of time, then the plural router route manager 151 disables the route computation processing communication units 21*a* through 21*c* which compute a route for the router, and deletes the MAC address of router from the tag value management information 161. Accordingly, the unwanted consumption of external computer resources for the faulty router is avoided.

When a new router is added, the added router sends a search message to search for the terminal device 150, which can detect the newly connected router.

A fourth embodiment of the present invention will be described below in detail with reference to the drawings.

According to the fourth embodiment, routes for a plurality of routers as shown in FIG. 4 are computed by a plurality of terminal devices shown in FIG. 16.

Figure 18:
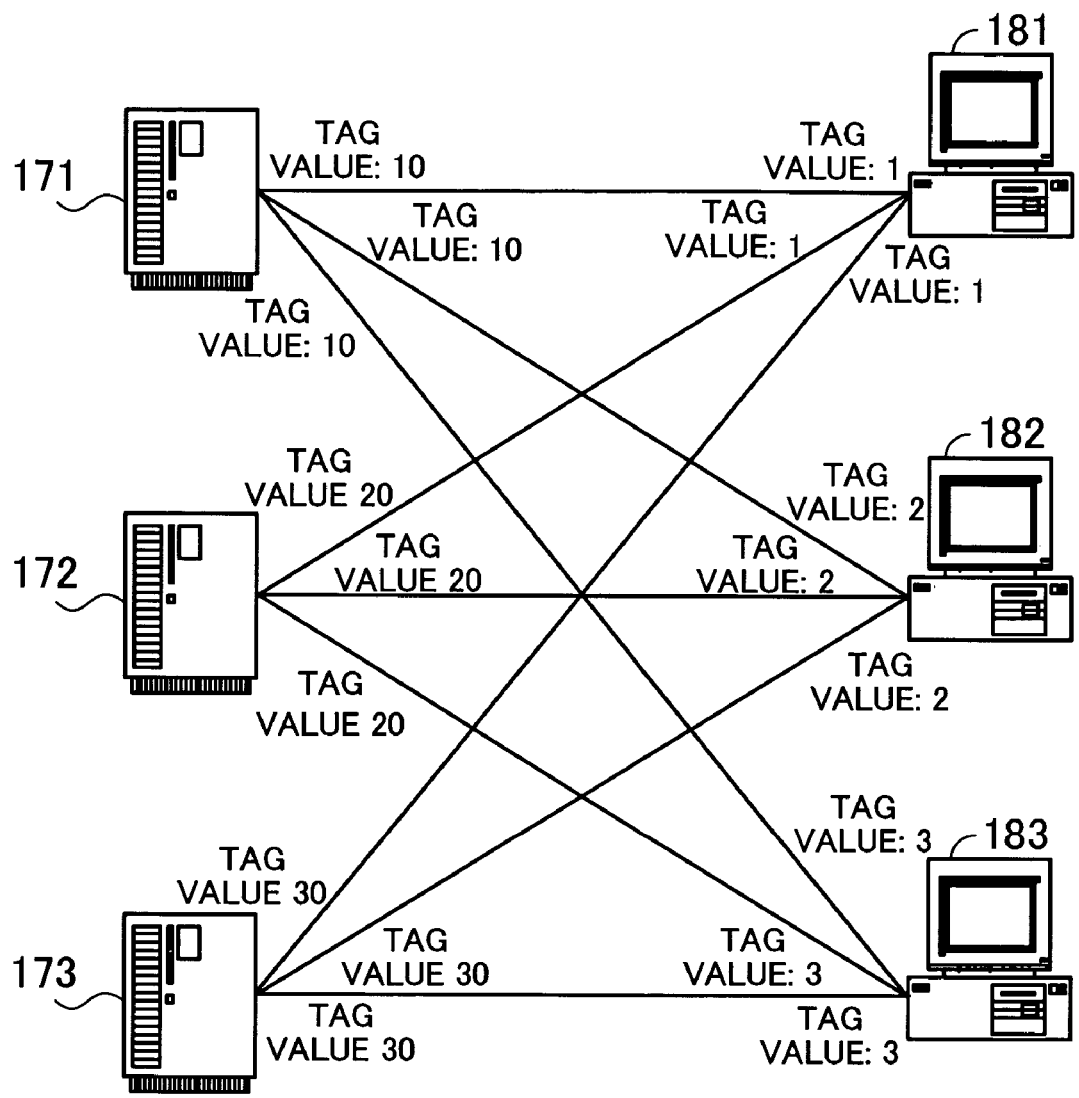
FIG. 18 is a view showing an arrangement of a route computing system according to a fourth embodiment of the present invention.

FIG. 18 shows an arrangement of a route computing system according to the fourth embodiment of the present invention.

As shown in FIG. 18, routers 171 through 173 are connected to terminal devices 181 through 183. Each of the routers 171 through 173 has the same functional blocks as those of the router 10 shown in FIG. 4, and each of the terminal devices 181 through 183 has the same functional blocks as those of the terminal device 150 shown in FIG. 16.

The routers 171 through 173 send search messages to the terminal devices 181 through 183. In response to the search messages, the terminal devices 181 through 183 return tag values that are designated by the network administrator to identify the terminal devices 181 through 183 to the routers 171 through 173. The routers 171 through 173 send tag values that are designated by the network administrator to identify the routers 171 through 173 to the terminal devices 181 through 183. The tag values of the routers 171 through 173 and the terminal devices 181 through 183 are determined by the network administrator because if the routers 171 through 173 and the terminal devices 181 through 183 automatically assign tag values, then the tag values would tend to overlap.

In the embodiment shown in FIG. 18, the tag values of the routers 171 through 173 are 10 through 30, respectively, and the tag values of the terminal devices 181 through 183 are 1 through 3, respectively. The terminal devices 181 through 183 send the tag values assigned thereto to the routers 171 through 173, which manage the tag values of the terminal devices 181 through 183. The routers 171 through 173 send the tag values assigned thereto to the terminal devices 181 through 183, which manage the tag values of the routers 171 through 173. The routers 171 through 173 and the terminal devices 181 through 183 communicate with each other using the tag values assigned thereto and the managed tag values of the companion units.

Figure 19:
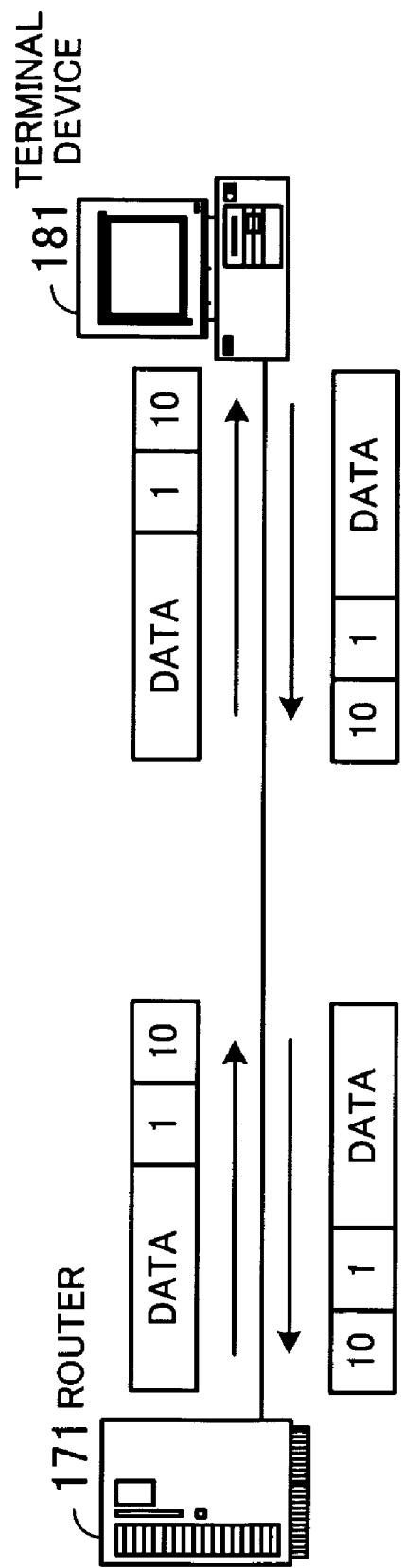
FIG. 19 is a view illustrative of communications based on tag values.

FIG. 19 is illustrative of communications based on tag values.

FIG. 19 shows the router 171 and the terminal device 181. When the router 171 sends a packet to the terminal device 181, the router 171 adds the tag value 10 assigned thereto and the tag value 1 of the terminal device 181 to the beginning end of data of the packet. When the terminal device 181 sends a packet to the router 171, the terminal device 181 adds the tag value 10 of the router 171 and then the tag value 1 assigned thereto to the beginning end of data of the packet.

Information about the terminal devices 181 through 183 which is managed by the external computer managers of the routers 171 through 173 will be described below.

FIG. 20 shows the data structure of information relative to the terminal devices that is managed by an external computer manager of the router.

In FIG. 20, external computer management information 191 represents information about the terminal devices 181 through 183 which is managed by the external computer manager of the router 171. The external computer management information 191 has columns of external computer MAC addresses, control port numbers, router identification tag values, external computer identification tag values, router information notified states, priorities, CPUs, and memories. The external computer management information 191 is stored in a memory such as a RAM or a HDD.

The column of external computer MAC addresses stores the MAC addresses of the terminal devices 181 through 183 searched for by the external computer manager. The column of control port numbers stores the port numbers of connected ports of the terminal devices 181 through 183 searched for by the external computer manager. The column of router identification tag values stores a tag value of the router 171 which is assigned by the network administrator. The column of external computer identification tag values stores tag values given to the terminal devices 181 through 183 searched for by the external computer manager. The column of router information notified states stores information as to whether the information about the router 171 itself has been sent to the terminal devices 181 through 183 or not. Specifically, the column of router information notified states has a subcolumn of configurational information which stores information as to whether configurational information of the router 171 has been sent to the terminal devices 181 through 183 or not. "SENT" indicates that the information has been sent, and "UNSENT" indicates that the information has not been sent. The column of router information notified states also has a subcolumn of protocol which stores information as to whether protocol information of the router 171 has been sent to the terminal devices 181 through 183 or not. "SENT" indicates that the information has been sent, and "UNSENT" indicates that the information has not been sent. The column of priorities stores priorities with which to receive forwarding control packets from the terminal devices 181 through 183. The priorities are determined by CPUs and memories to be described below. The column of CPUs stores CPU speeds of the terminal devices 181 through 183 searched for by the external computer manager. The column of memories stores memory capacities of the terminal devices 181 through 183 searched for by the external computer manager.

Management of tag values given to the terminal devices 181 through 183 will be described below.

FIG. 21 shows the data structure of tag value management information managed by a terminal device.

As shown in FIG. 21, tag value management information 192 includes tag values held and managed by the plural router route manager of the terminal device 181. The tag value management information 192 has columns of router MAC addresses, router identification tag values, external computer identification tag values, and management data information. The tag value management information 192 is stored in a memory such as a RAM or a HDD, for example.

The column of router MAC addresses stores the MAC addresses of the routers 171 through 173 with which the terminal device 181 communicates. The column of router identification tag values stores the tag values of the routers 171 through 173 that are sent from the routers 171 through 173. The column of external computer identification tag values store the tag value of the terminal device 181 that is assigned by the network administrator. The column of management data information stores identifiers of processes that are performed by the routers in the left column.

Operation of the route computing system shown in FIG. 18 to establish communications between the routers 171 through 173 and the terminal devices 181 through 183 and also to transfer frames between the routers 171 through 173 and the terminal devices 181 through 183 will be described below. First, operation of the route computing system to establish communications between the routers 171 through 173 and the terminal devices 181 through 183 will be described below.

The routers 171 through 173 send search messages to confirm whether an external computer is present on the LAN or not in the same manner as with the first embodiment. The terminal devices 181 through 183 receive the search messages, include the tag values assigned by the network administrator in the optional areas of search response messages, and send the search response messages to the routers 171 through 173.

When the external computer managers of the routers 171 through 173 receive the search response messages, they generate external computer management information 191 shown in FIG. 20, and register the tag values of the terminal devices 181 through 183 which are included in the optional areas of search response messages in the generate external computer management information 191. The external computer managers include the tag values assigned to the routers 171 through 173 by the network administrator in the optional areas of tag value notification messages, and send the tag value notification messages to the terminal devices 181 through 183.

In response to the tag value notification messages, the plural router route managers of the terminal devices 181 through 183 generate tag value management information 192 shown in FIG. 21, and register the tag values of the routers 171 through 173 which are included in the optional areas of the tag value notification messages in the tag value management information 192.

The routers 171 through 173 and the terminal devices 181 through 183 now manages the tag values for identifying the routers 171 through 173 and the terminal devices 181 through 183 for communications therebetween.

Operation of the route computing system shown in FIG. 18 to transfer frames between the routers 171 through 173 and the terminal devices 181 through 183 will be described below.

For transferring frames, the routers 171 through 173 and the terminal devices 181 through 183 store the tag values for identifying the routers 171 through 173 in the beginning ends of frames, as described above with reference to FIG. 19. The routers 171 through 173 and the terminal devices 181 through 183 then store the tag values for identifying the terminal devices 181 through 183, following the tag values for identifying the routers 171 through 173. For the terminal devices 181 through 183 to receive packets with tag values, the terminal devices 181 through 183 refer to the tag values in the second stage in order to recognize that the destinations are the terminal devices 181 through 183.

Each of the terminal devices 181 through 183 computes routes for the routers 171 through 173. Specifically, each of the terminal devices 181 through 183 receives control packets from the routers 171 through 173 and computes routes therefor. The routers 171 through 173 receive the computed route from the terminal device of the highest priority, among the routes computed by the terminal devices 181 through 183.

Thus, the routers 171 through 173 and the terminal devices 181 through 183 can identify sources of frames and process the frames. Since the routes for the plural routers can be computed in a distributed fashion by the plural external computers, the routes can be computed at a high speed at a low cost with increased reliability.

The route computing system according to the fourth embodiment is a combination of the route computing systems according to the first and third embodiments. A route computing system which is a combination of the route computing systems according to the second and third embodiments can be realized by assigning tag values to the routers and the terminal devices. In such a route computing system, the computation of routes of VPNs for a plurality of routers is distributed to a plurality of terminal devices. Each of the terminal devices 181 through 183 computes routes for the routers 171 through 173, and also computes routes for the routes of VPNs for the routers. Specifically, processes for computing routes for the terminal devices 181 through 183 are provided in association with the routers 171 through 173 and also with VPN_IDs. Specifically, the protocol processors 24a through 24c of the terminal devices 150 shown in FIG. 16 are provided in association with VPN_IDs. A plurality of such terminal devices 150 are provided, and each router receives only the computed route from the terminal device 150 of the highest priority.

The route computing system according to the present invention causes a terminal device to recompute destination information that represents the destination of a packet. The computation of destination information can be speeded up by replacing the terminal device with a higher-performance terminal device. The hardware of transmission device does not need to be redesigned and replaced, and the computation of destination information can be speeded up at a low cost.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A route computing system for computing a route, comprising:
   a transmission device; and
   a terminal device;
   wherein the transmission device comprises:
   destination information receiving means for receiving destination information indicative of computed routes,
   destination information storing means for storing destination information supplied thereto,
   routing packet sending means for sending a received routing protocol packet, and
   route computation processing switching means for determining whether the terminal device is connected to the transmission device and, if the terminal device is found connected, causing the routing packet sending means to send the received routing protocol packet to the terminal for calculation of routes, while permitting the destination information receiving means to receive destination information from the terminal device, instead of computing routes by the route computation processing switching means itself, and if the terminal device is found not connected, computing routes based on the received routing protocol packet and supplying the computed routes to the destination information storing means, and
   wherein the terminal device comprises:
   routing packet receiving means for receiving the routing protocol packet sent from the transmission device,
   computing means for computing destination information based on the received routing protocol packet, and
   destination information sending means for sending the computed destination information to the transmission device.

2. The route computing system according to claim 1, wherein the destination information receiving means receives the destination information from the terminal device having a highest processing capability among a plurality of the terminal devices.

3. The route computing system according to claim 2, wherein the destination information receiving means receives the destination information from the terminal device having a next highest processing capability if the terminal device suffers a fault.

4. The route computing system according to claim 1, wherein the transmission device has port information sending means for sending port information about a port thereof, and the terminal device has port information receiving means for receiving the port information and change computing means for recomputing the destination information if the port information is changed.

5. The route computing system according to claim 1, wherein the transmission device has searching means for periodically searching for the terminal device which is connected to the network.

6. The route computing system according to claim 1, wherein the transmission device is connected to the other transmission device by a virtual dedicated line, and the computing means is provided in association with the virtual dedicated line for recomputing the destination information on the virtual dedicated line.

7. The route computing system according to claim 1, wherein each of the transmission devices also has the computing means for recomputing the destination information for each of the transmission devices.

8. The route computing system according to claim 7, wherein the destination information receiving means receives the destination information from the terminal device having a highest processing capability among a plurality of the terminal devices.

9. The route computing system according to claim 7, wherein the transmission device is connected to the other transmission device by a virtual dedicated line, and the computing means is provided in association with the virtual dedicated line for recomputing the destination information on the virtual dedicated line.

10. A route computing method in a system including a transmission device and a terminal device to compute network routes, comprising:
    determining, at the transmission device, whether the terminal device is connected to the transmission device;
    sending a routing protocol packet from the transmission device to the terminal device via a network, if said determination has determined that the terminal device is connected to the transmission device;
    computing routes at the transmission device based on the routing protocol packet and supplying the computed routes as destination information, if said determination has determined that the terminal device is not connected to the transmission device;
    permitting the terminal device, rather than the transmission device, to compute routes based on the routing protocol packet and supply the computed routes as destination information to the transmission device, if said determination has determined that the terminal device is connected to the transmission device; and
    storing, at the transmission device, the destination information which is received from the terminal device or computed in the transmission device.

* * * * *